United States Patent
Dultz et al.

(10) Patent No.: US 6,649,087 B1
(45) Date of Patent: Nov. 18, 2003

(54) LIQUID CRYSTALLINE MATERIALS FOR OPTICAL PHASE MODULATION

(75) Inventors: Wolfgang Dultz, Frankfurt am Main (DE); Leonid Beresnev, Columbia, MD (US); Wolfgang Haase, Reinheim (DE); Sergei Pikin, Moscow (RU); Thomas Weyrauch, Michelstadt (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/914,250

(22) PCT Filed: Feb. 21, 2000

(86) PCT No.: PCT/EP00/01395
§ 371 (c)(1),
(2), (4) Date: Aug. 24, 2001

(87) PCT Pub. No.: WO00/50535
PCT Pub. Date: Aug. 31, 2000

(30) Foreign Application Priority Data

Feb. 24, 1999 (DE) .......................... 199 08 042

(51) Int. Cl.[7] .............................................. C09K 19/52
(52) U.S. Cl. ................................... 252/299.01; 428/1.1
(58) Field of Search ...................... 252/299.01, 299.1, 252/299.2, 299.3, 299.4; 428/1.1

(56) References Cited

U.S. PATENT DOCUMENTS 6,181,407 B1 * 1/2001 Dultz et al. .................. 349/172
6,540,939 B1 * 4/2003 Martin et al. ............ 252/299.01

FOREIGN PATENT DOCUMENTS

JP 08 217728 8/1996

OTHER PUBLICATIONS

Watanabe et al, "Antiferroelectric Smetic Liquid Crystal Formed by Achiral Twin Dimer with Two Mesogenic Groups Linked by Alkylene Spacer", Japanese Journal of Applied Physics, Part 2, Apr. 1, 1998, vol. 37, No. 4A, pp. L401–L403.

Attard, G.S. et al., "Non–Symmetric Dimeric Liquid Crystals: The Preparation and Properties of the –(4–Cyanobiphenyl–4'Oxy)–(4–N–Alkylaniline benzylidene–4'Oxy) Alkanes", Liquid Crystals, GB, Taylor and Francis Ltd., Apr. 1, 1994, vol. 16, No. 4, pp. 529–581.

Luckhurst, G.R. et al., "The Intercalated Smectic A Phase: The Liquid Crystal Properties of the Alpha–(4–cyanobiphenyl–4'–yloxy)–omega–(4–alkyloxycinnamate)alkanes", Liquid Crystals, vol. 18, No. 5, 1995, pp. 801–809.

Tsvetkov, N.V. et al., "Electro–Optical Properties of 4,4'–BIS–UW–(4–Cyanobiphenyl–4'–Yloxyalkyloxy Biphenyls Nematics", Liquid Crystals, GB, Taylor and Francis Ltd., Mar. 1, 1997, vol. 22, No. 3, pp. 245–253.

Rozhanskii, I.L. et al., "Synthesis and Thermal Properties of Dimeric Alkoxy–Substituted Tolans", Liquid Crystals, GB, Taylor and Francis Ltd., Nov. 1, 1996, vol. 21, No. 5, pp. 631–643.

* cited by examiner

*Primary Examiner*—Mark F. Huff
*Assistant Examiner*—Jennifer R. Sadula
(74) *Attorney, Agent, or Firm*—Kenyon & Kenyon

(57) ABSTRACT

A liquid crystalline material having a lamellar structure can be used for phase modulation. A liquid crystal having arcuated or angular dimer molecules so that the molecules each include two central units, and the longitudinal axes of the two central units exhibit at least approximately oppositely directed inclination angles with respect to the layer normal z. By configuring the two central units of the dimer molecule in accordance with the present invention, the molecular index ellipsoid, which is essentially composed of the components of the two readily polarizable central units, may be positioned such that the optical axis is always situated in parallel to the layer normal z, making it possible to prevent the light, which propagates in a defined direction orthogonally to the layer normal through the liquid crystalline material, from undergoing a polarization modulation simultaneously with the phase modulation.

19 Claims, 34 Drawing Sheets

LIQUID CRYSTALLINE MATERIALS FOR OPTICAL PHASE MODULATION

FIELD OF THE INVENTION

The present invention relates to a liquid crystalline material having a lamellar layered or stratified structure, as well as to a device for modulating light which has a liquid crystalline material having a lamellar layered or stratified structure.

BACKGROUND INFORMATION

It is believed that current trends of transmitting and processing information optically have significantly increased the need for components for controlling the properties of light beams. In this context, varying the phase of light is also of fundamental importance for many adaptive optical systems, for example, astronomical or terrestrial imaging systems, optical communications systems, or for systems used to simulate turbulence. Available dielectric, electrooptic crystals, for example, $LiNbO_3$, which can be used, for example, for wavefront correction, may exhibit long switching times, small apertures, and minimal variations in refractive indices, the latter necessitating high switching voltages to set a predefined phase modulation.

Recently, interest has intensified in liquid crystals as promising materials for use in wavefront control. In this context, the optical properties are electrically controlled, for example by orienting and deforming the local index ellipsoid of the material. It is believed that some important electrooptic effects in liquid crystals manifest themselves in a simultaneous change in the phase and polarization of the light transmitted through the liquid crystal, the change in polarization, however, being an undesirable secondary effect, for example, in adaptive optical systems and in most other phase modulation applications.

It is believed that the electrically induced transition from a homogeneous, planar orientation to a homeotropic orientation in nematic liquid crystals, described as the S-effect, may bring about a pure phase modulation when linearly polarized light is used, whose polarization plane is situated in parallel to the director of the liquid crystal in the homogeneous, planar orientation. Materials of this kind may be employed in pixelated, electrically controlled, spatially resolved phase modulators, but also in optically addressable variants, which additionally have a photoconductive layer. In both cases, several ten milliseconds may be needed to achieve a phase modulation of $2\pi$, higher phase delays requiring relatively large layer thicknesses of about 5 $\mu$m and an electrically controllable refractive index variation of about $\Delta n=0.15$. Since switching times increase with cell thickness, the most often used wavefront correctors, which work on the basis of nematic liquid crystals, have a pulse frequency within the range of a few Hz.

In comparison, chiral-smectic, ferroelectric liquid crystals render possible switching times in the microsecond range. Available methods heretofore essentially consider two effects in the use of ferroelectric liquid crystals of this kind. U.S. Pat. Nos. 4,838,663 and 4,563,059 discuss a bistable switching between two surface-stabilized orientation states, and Swiss Patent No. CH-3722/87 discusses the deformation of the helical superstructure. While in the first case, virtually only the optical axis is rotated and no change in the refractive index occurs, in the second case, a rotation of the optical axis and a variation in the refractive index occur simultaneously. Due to the rotation of axes, the effects in the available chiral-smectic, ferroelectric liquid crystals always result in a polarization change in the light transmitted through the liquid crystal, which makes the available ferroelectric crystals appear to be unsuited for pure wavefront corrections.

Polyphilic liquid crystals, whose molecules may be composed of a rigid, readily polarizable central group including two or three phenyl rings, and of two, more flexible wing groups, in particular aliphatic chains, are also available. When an aliphatic wing group is replaced by a perfluorinated chain, a polyphilic separation of the molecular components may be achieved, the molecules thereby ordering themselves in the liquid crystalline state such that the perfluorinated groups predominately face in the same direction. It is believed that this behavior was verified in the reference, "Ferroelectrics", Tournilhac et al., volume 114, pages 283–287, 1991 and in "Liquid Crystals", volume 14, pages 405–414, 1993. In the investigated material $F(CF_2)_8(CH_2)_{11}$—O—Ph—Ph—CN, one ascertained an optical tilt angle $\theta$ of 48° and an inclination angle $\theta_F$ of the fluorinated chain of 28°; in the material $F(CF_2)_8(CH_2)_{11}$—O—Ph—$_N$Ph—CN, an optical tilt angle $\theta$ of 49° and an inclination angle $\theta_F$ of the fluorinated chain of 30°; and in the substance $F(CF_2)_8(CH^2)_{11}$—O—Ph—Ph—CO—O—$CH_2CF_3$, an optical tilt angle $\theta$ of 51° and an inclination angle $\theta_F$ of the fluorinated chain of 33°; Ph being an abbreviation for a phenyl ring and $_N$Ph for a pyridine ring. For the mentioned polyphilic liquid crystals having perfluorinated chains, the references discusses that the optical tilt angle $\theta$ specific to the rigid central group and the inclination angle $\theta_F$ of the perfluorinated chain differed from the layer normal z. Further, when perfluorinated chains are used, there may be a reduction in the molecular rotational viscosity of ferroelectric liquid crystals, so that low switching times within the range of less than 15 sec may be attainable.

However, the discussed liquid crystals may have some generally occurring polarization modulation, which may not be acceptable for most phase modulation applications.

SUMMARY OF THE INVENTION

An exemplary embodiment of the present invention is directed to providing a liquid crystalline material having a lamellar structure which can be used exclusively for phase modulation.

Another exemplary embodiment of the present invention is directed to a new liquid-crystal material class having a lamellar layered structure, the liquid crystal has arcuated or angular dimer molecules, which each include two central units, the longitudinal axes of the two central units having at least approximately opposite inclination angles, for example, opposite with respect to the layer normal. With the arrangement or system in accordance with the present invention of the two central units of the dimer molecule, the molecular index ellipsoid, which is substantially composed of the components of the two readily polarizable central units, may be positioned such that the optical axis is always parallel to the layer normal, so that a polarization modulation of light may be prevented, which is transmitted in a defined direction, perpendicularly to the layer normal through the liquid crystalline material.

To maximize the desired phase modulation, depending on the specific embodiment of the present invention, the amount of the two inclination angles may be within the range of about 10 to 90°. In order to construct the dimer molecule and thereby form a vertex or peak, the two central units may be bonded or joined together, it being possible for the bond to be formed by at least one neutral, molecular chain. Depending on the specific embodiment of the present invention, the vertex between the two central units of the dimer molecule can be an angle apex or, in the case that an arc may be formed between the central units, it may also be an arc midpoint.

The formation (or configuration or geometry) of the liquid crystalline material in accordance with the present invention can be applied to a multiplicity of thermotropic and lyotropic liquid crystals. In this context, the vertices (or peaks) of the dimer molecules of adjacent layers can be nearly unidirectional or, in another specific embodiment, approximately directed in opposite directions, thereby forming a double-layer structure.

To produce a helical structure having a predefined pitch, which can be canceled by applying an external electric field, so that a phase modulation is adjustable, the azimuth angles of the vertices of successive layers may change uniformly by a predefined value, so that the vertices rotate along the z-direction. However, to form a helical structure having double layers and a predefined pitch, the azimuth angle of a pair of vertices of successive double layers may be affected by a predefined value, so that the pairs of vertices rotate along the z-direction.

To enable an external electric field to act upon the arcuated or angular dimer molecules, the molecules each exhibit a transverse dipole moment. If the dipole moment is orthogonal to the optical axis, i.e., to the layer normal, the electric field may function optimally to modify the helical structure and, thus, to produce a pure phase modulation.

To produce the described helical structure, the dimer molecules may have at least one chiral center, in particular outside of the rigid central units. Providing a chiral center of this kind in the dimer molecule may allow that in an interplay with other molecular components of the dimer, it is able to produce a permanent dipole moment. To form specific helical structures, each of the dimer molecules may have two chiral centers.

To construct the dimer molecules of the liquid crystalline material in accordance with the present invention, the molecules between the two central units, i.e., as wing groups, can have at least one aliphatic fragment. In accordance with the present invention, the aliphatic fragments can be made of carbon chains in the form —$(CH_2)_n$—, n being within the interval from 0 to 16.

To ensure that a spontaneous polarization of the liquid crystalline material of the present invention may be produced macroscopically, the dimer molecules may each contain at least one polyphilic fragment that is located asymmetrically with respect to the vertex of the molecule. An effect of the asymmetrical, polyphilic molecular structure may be that a parallel positioning (or configuration) of adjacent molecules is preferred within one layer over an antiparallel positioning, so that there is spontaneous polarization within one layer. Thus, it may prevent the dipole moments of two adjacent, oppositely oriented molecules from being mutually compensated since both possible orientations are otherwise energetically equivalent and, therefore, on the average, are occupied with the same rate of occurrence. Since the oppositely oriented molecules exhibit dipole moments having opposite signs, no spontaneous polarization occurs in the case of the antiparallel positioning. In accordance with the present invention, the asymmetrical, polyphilic molecular structure can be achieved in that the polyphilic fragment has at least one perfluorinated chain of the form —$(CF_2)_n$—, where n can lie between 4 and 16.

Depending on the specific embodiment of the present invention, in the absence of an external electric field, the pitch of the helical structure can be within the range of between 50 to 1400 nm.

The liquid crystalline material in accordance with the present invention may be used for the phase modulation of light, for example, in an appropriate device. A device of this kind may be distinguished by the ability to generate an electric field substantially perpendicularly to the layer normal, and by the fact that the light is transmitted in a direction perpendicular to the layer normal through the liquid crystalline material. In this manner, besides the desired phase modulation, the light may be prevented from undergoing a polarization modulation. Using the liquid crystalline material of the present invention, one can construct phase modulators of the reflective type, as well as of the transmission type. In addition, the phase of light can be modulated as a spatially resolved phase using a multi-pixel structure. Also, the physical properties of the liquid crystalline material may render possible optically addressable, spatially resolved phase modulators, in which a photoconductive layer may be used to produce a spatially resolved external field with the assistance of incident light radiation.

DETAILED DESCRIPTION

Figure 1:
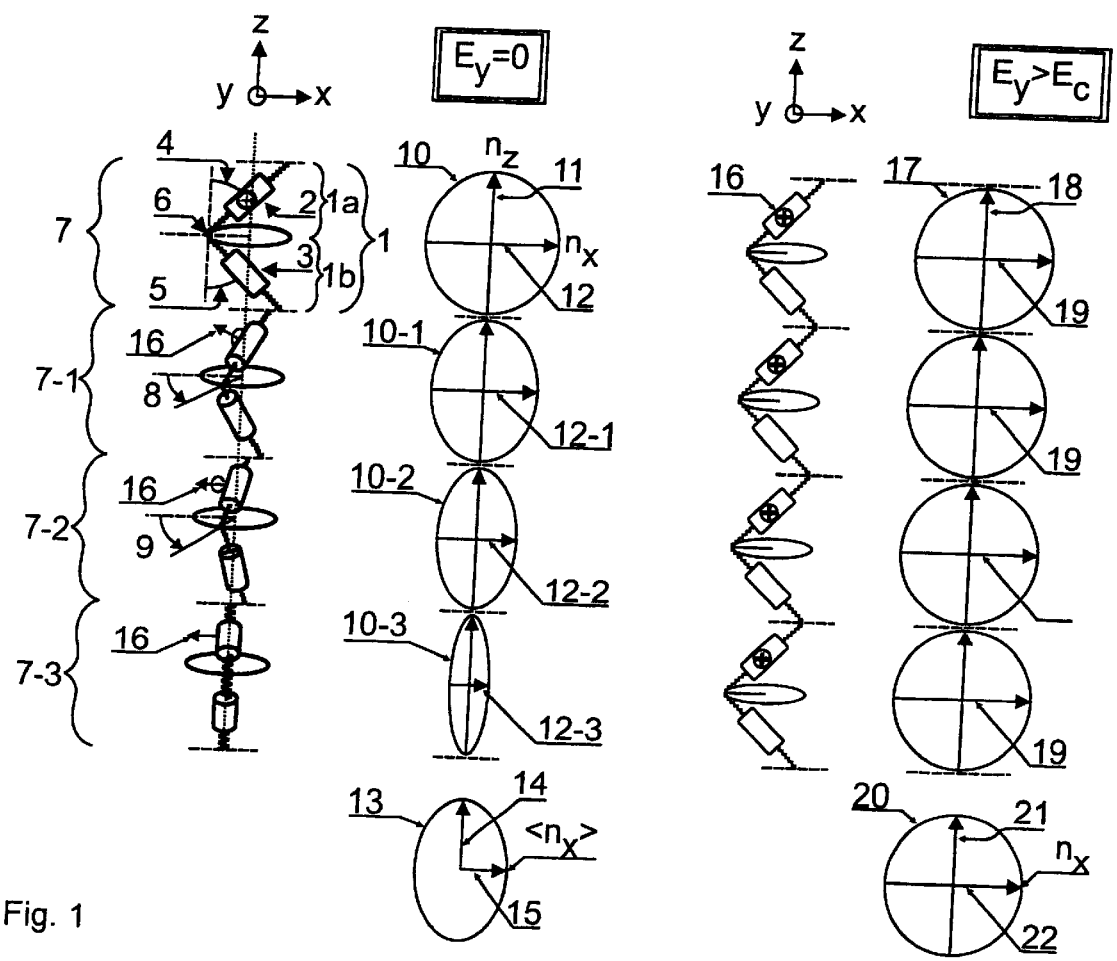
FIG. 1 shows a helical structure of an exemplary embodiment of the liquid crystalline material.

The exemplary liquid crystalline materials and devices of the present invention discussed in the following have a smectic layer structure, the liquid crystal being composed of molecules which are made up of two subunits 1a and 1b, whose longitudinal axes are tilted with respect to one another such that the entire molecule takes on an arcuated or angular shape, referring to FIG. 1. Subunits 1a and 1b may be each made up of a rigid, electronically readily polarizable central group (2, 3) and of a more flexible wing group, which, in at least one of the two subunits 1a and 1b, contains a chiral center. The two central groups 2 and 3, respectively, exhibit at least approximately an opposite, for example, exactly opposite inclination angle 4 and 5, respectively, with respect to the layer normal z. Central units 2 and 3 are joined or bonded or linked by neutral molecular chains, such as by aliphatic chains, siloxanes, or by fluorinated alkyl chains. To realize the angular form, a ring system, for example, a metasubstituted phenyl ring, may also be present in the arc midpoint or in angle apex 6. To simplify the description, the arc midpoint or the angle apex shall also be referred to herein as vertex. The longitudinal axes of subunits 1a and 1b are defined by the longitudinal axes of central groups 2 and 3. As mentioned, the molecules form a smectic phase including layers 7, 7-1, 7-2, 7-3. See FIG. 1. Due to the chiral centers in the molecules, a helical superstructure may be formed, which is distinguished by a slight rotation about layer normal z of the arc plane spanned (or defined) by the longitudinal axes of central groups 2 and 3, from layer to layer along layer normal z. The rotation of vertex 6 in the azimuthal plane xy at the transition from layer 7 to layer 7-1 may be characterized by angle 8. In FIG. 1, one fourth of the helical pitch is shown schematically.

The refractive indices of each individual layer 7, 7-1, 7-2, etc., may be defined by a corresponding index ellipsoid (indicatrix). In FIG. 1, each of intersecting ellipses 10, 10-1, 10-2, etc. is shown with the xz-plane, which is valid for light propagating in the y-direction. Main axis 11 parallel to layer normal z is the same for all layers 7, 7-1, etc., while main axes 12, 12-1, 12-2, etc., vary from layer to layer due to the rotation of the arc plane. For the entire helical structure, an average indicatrix results, whose intersecting ellipse 13 is illustrated by the xz-plane in FIG. 1. Main axis 14 parallel to z is identical to main axis 11 of the individual layers, while main axis 15 which is parallel to x and represents refractive index $<n_x>$ is derived from an averaging of all possible azimuthal angles. Due to the symmetry of the helical structure, the average refractive index ellipsoid may be a rotation ellipsoid having z as the axis of rotation, i.e., given an unperturbed helix, it holds that $<n_y>=<n_x>$. At pitches below the light wavelengths, the optical properties may be determined by averaging the properties of the individual layers. Since the molecules of the crystalline material contain a chiral center in at least one subunit, a spontaneous polarization may result having a local dipole moment 16, which is orthogonal to layer normal z and orthogonal to the arc plane of the particular molecule 1. As a result of the interaction of these dipole moments with an electric field $E_y$ applied in the y-direction, the helix may be deformed and, in the extreme case, completely coiled. See the right part of FIG. 1. In this extreme case, the index ellipsoids, i.e., intersecting ellipses 17 through the xz-plane, may be identical to main axes 18 and 19 and correspond to the molecular index ellipsoid. The index ellipsoid of the entire structure, whose intersection 20 with the xz-plane having the two main axes 21 and 22 is shown in FIG. 1, corresponds to that of the individual layers. Accordingly, the position of the three main axes of the index ellipsoid does not change under the action of an electric field; they are always parallel to the three coordinate axes x, y, and z. The main axis which is parallel to z and which indicates refractive index $n_z$, is the same in all cases (11, 18, 21). Accordingly, refractive index $n_z$ is identical in the helical, in the deformed helical, and in the completely coiled structure. In contrast, with increasing electric field $E_y$, the refractive index varies from average value $<n_x>$ of intersecting ellipse 13 to molecular value $n_x$ of intersecting ellipse 20. This means that the light propagating in the y-direction which is polarized in parallel to the smectic layers, i.e., which is linearly polarized in parallel to the x-axis, may undergo a phase shift in dependence upon the electric field, without any change in the polarization plane. The maximum value of the phase shift is determined by the difference between the values of the two main axes 15 and 22 and scales linearly with the thickness of the liquid crystal layer in the y-direction.

Figure 2:
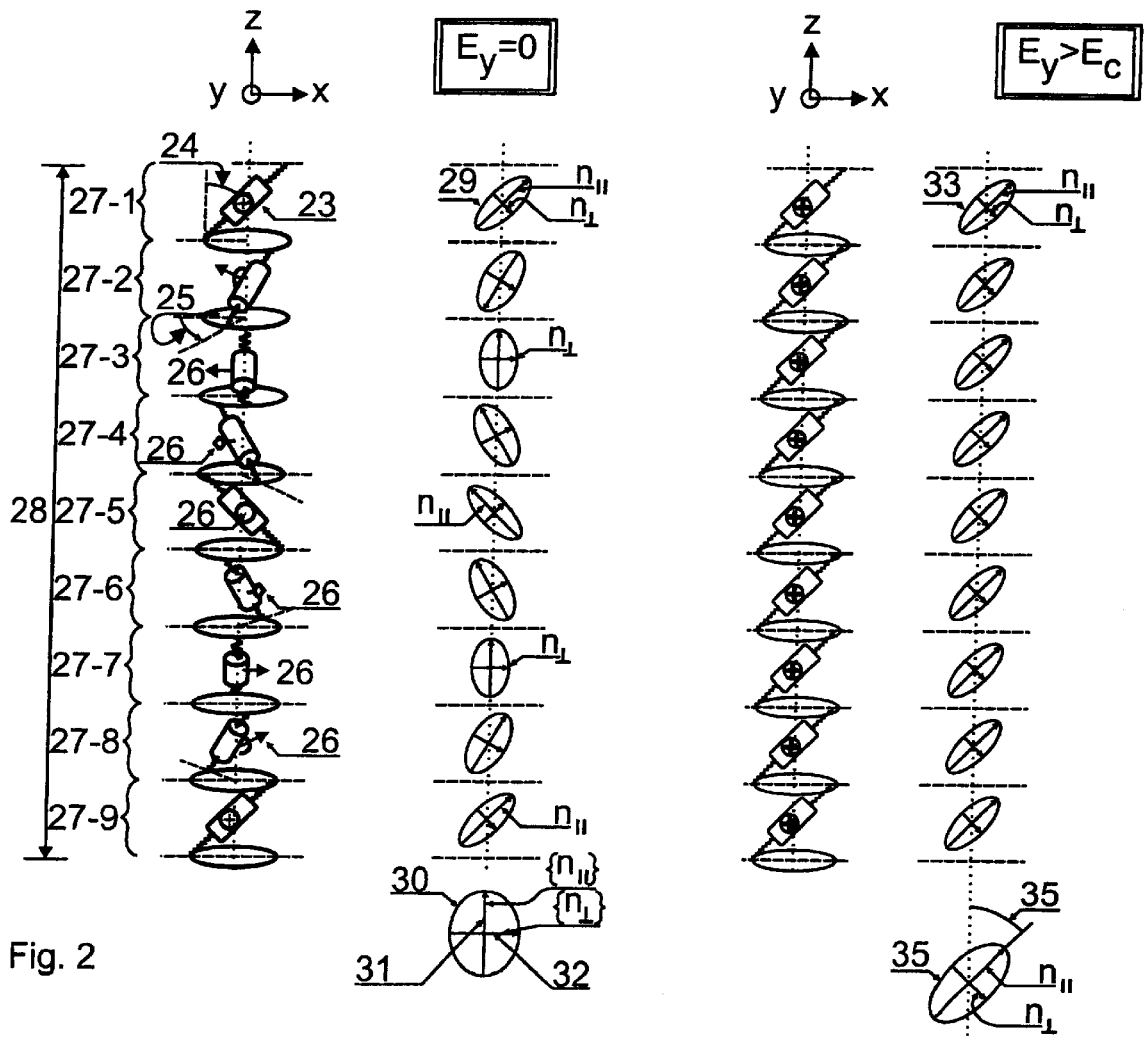
FIG. 2 shows a helical structure of an exemplary liquid crystalline material according to the related art.

FIG. 2 shows the structure and the layer structure of an available chiral-smectic ferroelectric liquid crystal. The molecules are arranged in layers 27-1, 27-2, etc. Within one layer, the longitudinal molecular axes have a preferred orientation, which indicates the director. The director is tilted with respect to layer normal Z by tilt angle 24. Here as well, a helical superstructure may be formed, which is characterized by pitch 28. Decisive for a light propagation in the y-direction is intersecting ellipse 29 of the index ellipsoid with the xz-plane. It varies, with respect to its main axes, from layer to layer, i.e., the optical axis is not fixed, in contrast to the instance depicted in FIG. 1. In the case that pitch 28 is smaller than the light wavelength, the optical properties may be characterized by an effective indicatrix, which may be calculated by averaging the local property and which, due to the symmetry of the phase, again represents a rotation ellipsoid having z as the axis of rotation. In contrast to the preceding case, when working with the liquid crystal of the present invention, the optical axis of the effective indicatrix may rotate when the helix is unwound by an external field. See the intersecting ellipse in FIG. 2. Since the optical axis is not fixed, light transmitted through the liquid crystal undergoes the above mentioned, undesired polarization modulation does not occur in the embodiments of the liquid crystal of the present invention.

Depending on the specific embodiment of the present invention, the directions of vertices 6 of adjacent layers, i.e., the orientation of the arc planes, can be nearly the same or, however, assume an azimuth angle of nearly 180°, which, in the first case, corresponds to a ferroelectric structure and, in the second case, to an antiferroelectric structure. An example of an antiferroelectric structure is given in FIG. 3. Vertices 6 of adjacent layers have more or less an opposite orientation, so that double layers 7, 7A; 7-1, 7A-1, etc., are formed. Refractive index $<n_x>$, which corresponds to semi-axis 15 of intersecting ellipse 13, can be varied by an electric field $E_x$ from $<m_x>_{min}$ to $<n_x>_{max}$. In the extreme case of the complete winding of the helix above a characteristic threshold field strength $E_C$, the conditions in the ferroelectric and in the antiferroelectric structure are optically equivalent. For field strengths smaller than the threshold field strength, the refractive index may be continuously varied, without a polarization modulation additionally occurring.

Figure 3:
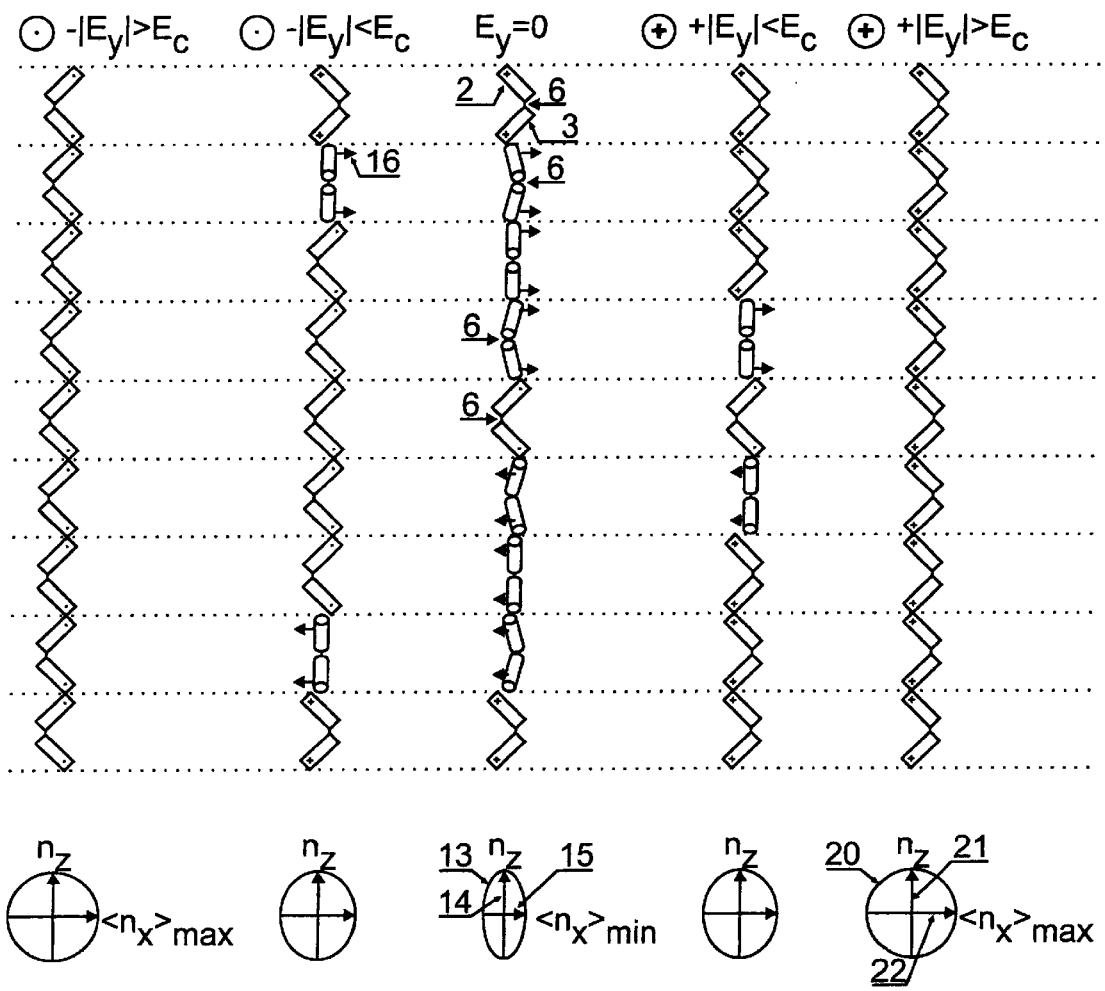
FIG. 3 shows a helical structure of another exemplary embodiment of the liquid crystalline material according to the present invention.

To obtain an indication of the attainable phase modulation, the refractive indices of the deformed and of the undeformed helical liquid crystal structures may be calculated. Referring to FIG. 3, in the process, the beginning assumption may be that the readily polarizable, rigid centers 2, 3 of subunits 1a, 1b are decisive. For each central unit of the dimer molecule, intersecting ellipse 2', 3' of the molecular index ellipsoid is shown with the xz-plane. The semi-axes of intersecting ellipses 2', 3' correspond to molecular refractive indices $n_{81}$ along the longitudinal axis and $n_⊥$ perpendicularly to the longitudinal axis. By adding the index ellipsoids of central units 2 and 3 in the illustrated coordinate system, the indicatrix 10 of the entire arcuated or angular molecule 1 may be obtained. The molecular index ellipsoid in the selected coordinate system of FIG. 3 may be present with the optical axis situated in parallel to layer normal Z in diagonal form, since the non-diagonal elements of the two central units cancel each other out, the assumption being that any existing biaxiality is negligibly small.

Given the selected molecular position in the xz plane, the tensor that is derived also corresponds to the tensor of a helix that is completely unwound by the application of a sufficiently high electric field $E_y$. See FIG. 1, right side.

The refractive indices for the entire molecule are expressed as:

$$n_x = \sqrt{n_⊥^2 \cos^2\theta + n_\|^2 \sin^2\theta};$$

$$n_y = n_⊥;$$

$$n_z = \sqrt{n_⊥^2 \sin^2\theta + n_\|^2 \cos^2\theta};$$

Other molecular orientations that occur in the helical structure can be described by an azimuth angle φ that differs from zero, i.e., the angle between the lines of intersection of the arc plane with the xy-plane and the X-axis. If an unperturbed helix is at hand in the case of the materials of the present invention, the refractive indices are calculated from the average of a φ-dependent ε-tensor in the interval from 0 to 2π for the angle φ, all values of φ being equally weighted. From this, one derives the average refractive indices:

$$\langle n_x \rangle = \langle n_y \rangle = \sqrt{\left(n_⊥^2(1+\cos^2\theta) + n_\|^2 \sin^2\theta\right)/2}$$

If an electric field, which is smaller than the threshold field strength $E_C$, is applied in the y-direction to the liquid crystal material of the present invention, then a deformation of the helix follows, so that the values for angle φ are no longer equally distributed. The deformation may be approximately numerically calculated.

Figure 4:
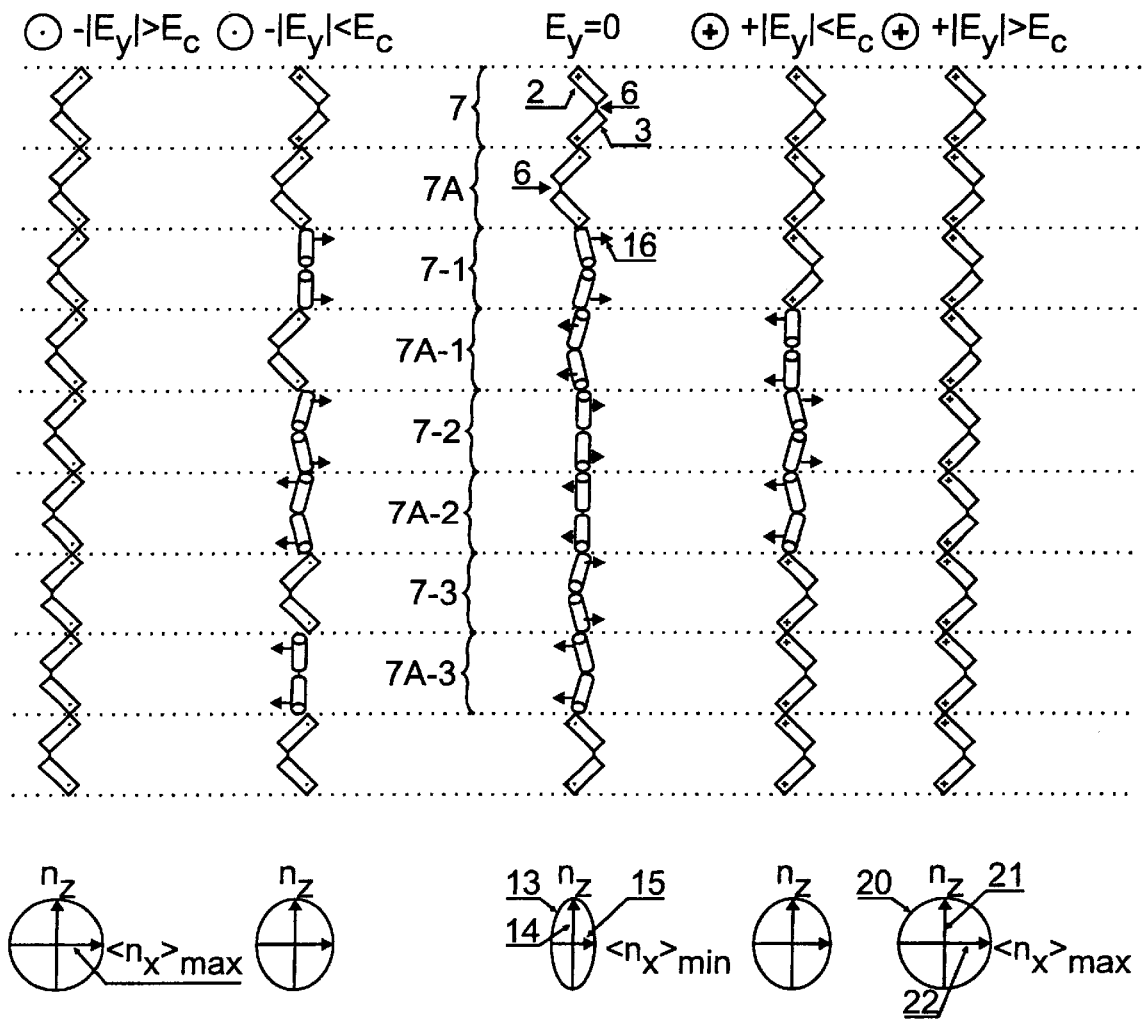
FIG. 4 shows a composition of the indicatrix for a dimer molecule from components of the central units.

FIG. 4 depicts the calculated effective, i.e., average refractive indices $<n_x>$ and $<n_z>$ of an undeformed helix structure according to FIG. 1, the values $n_\|=1.65$, $n_⊥=1.5$ and, respectively, $n_\|=1.7$ and $n_⊥=1.45$ being used for the refractive indices of central groups 1 and 2. In response to an increasing tilt angle θ, the refractive index anisotropy initially decreases, passes through the value 0, and, with an inverted sign, then increases again. In the completely coiled state, the directions of the optical axes are the same.

Figure 5:
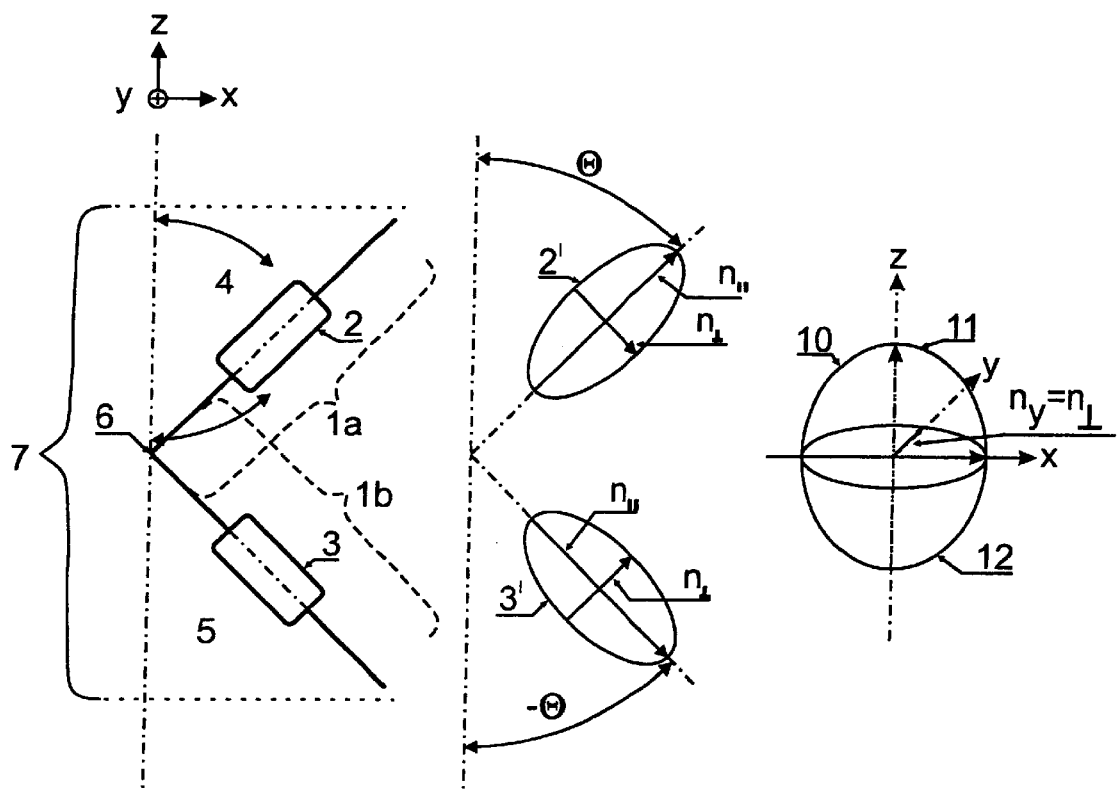
FIG. 5 shows a calculated, average refractive index of an exemplary liquid crystalline material according to the present invention in the case of an undeformed helix, as a function of inclination angle $\theta$.
Figure 6:
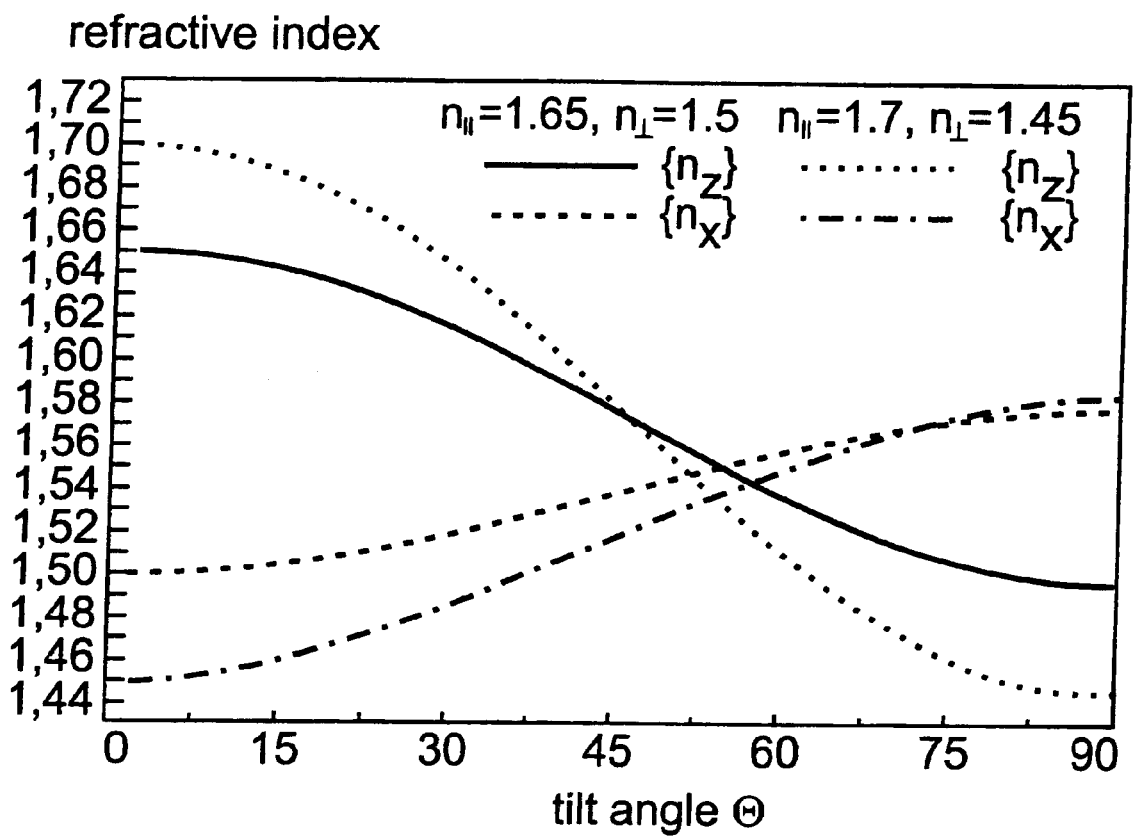
FIG. 6 shows a calculated, average refractive index of an exemplary liquid crystalline material according to the present invention in the case of a completely unwound helix, as a function of inclination angle $\theta$.
Figure 7:
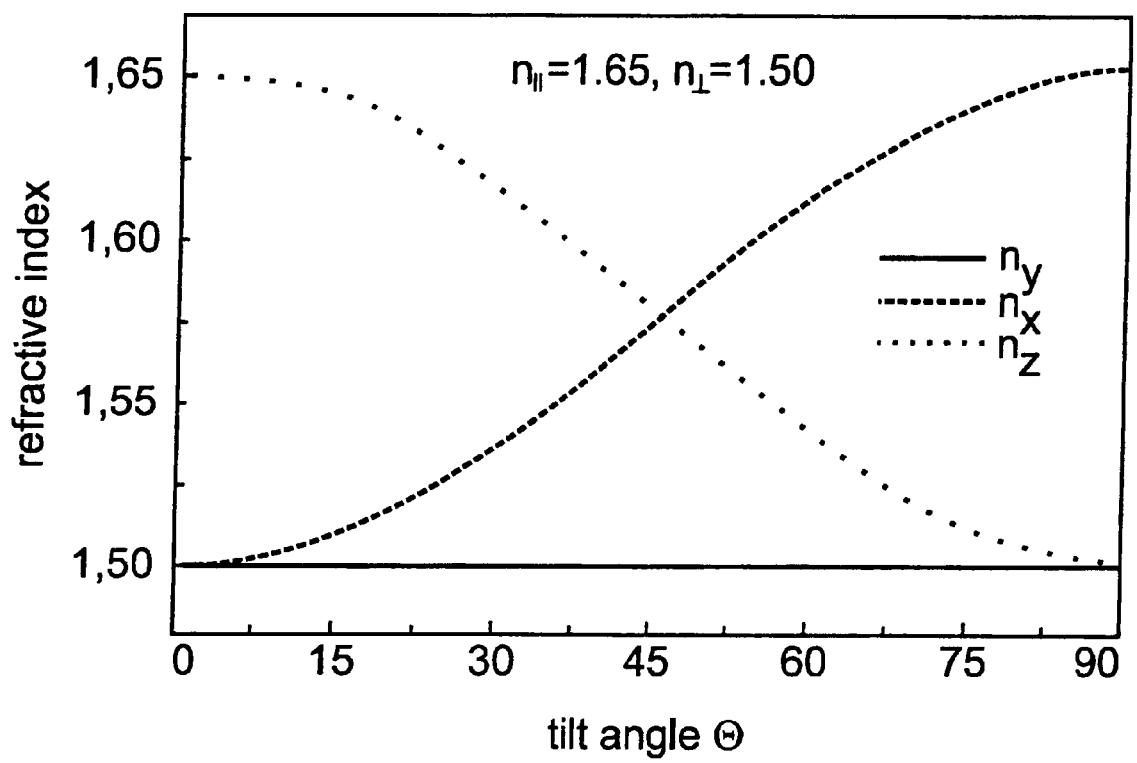
FIG. 7 shows a maximum of the refractive index modulation $\delta n_x$ of an exemplary liquid crystalline material according to the present invention as a function of inclination angle $\theta$.
Figure 8:
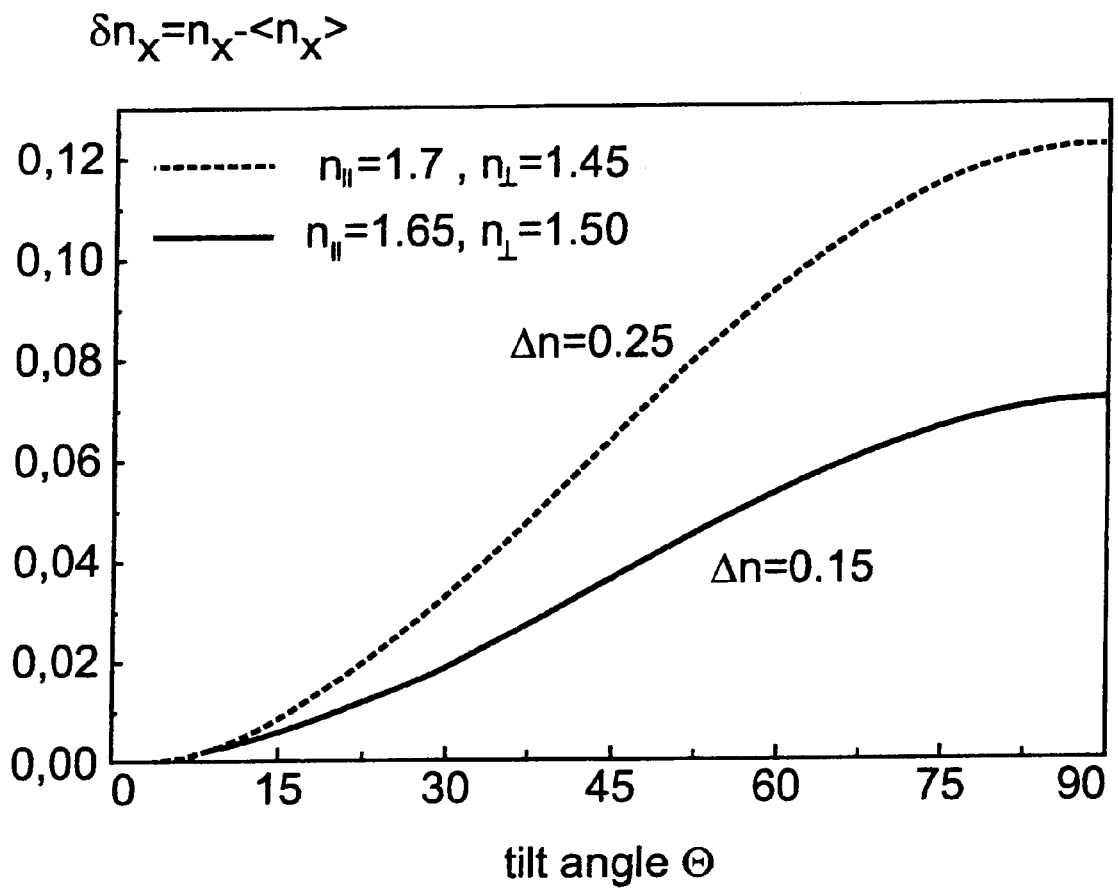
FIG. 8 shows an exemplary dependency of a refractive index variation on electric field strength E and on inclination angle $\theta$.

In FIG. 5, the calculated effective refractive indices $n_x$, $n_y$ and $n_z$ for the completely unwound state are shown as a function of tilt angle θ, in which case $n_\|=1.65$ and $n_⊥=1.5$ were selected for the refractive indices of central groups 2 and 3. FIGS. 6, 7 and 8 illustrate graphically the maximum value $\delta n_x^{max}$ of the electrically controllable refractive index difference $\delta n_x$ as a function of inclination angle θ for two different sets of refractive indices ($n_\|=1.7$, $n_⊥=1.45$ and $n_\|=1.65$, $n_⊥=1.5$). This maximum value is given by the difference between the values of the completely unwound state and those of the unperturbed helix, i.e., $\delta n_x^{max} = n_x - <n_x>$. Refractive index $n_z$ is not dependent upon the field and is identical for both cases.

Figure 9:
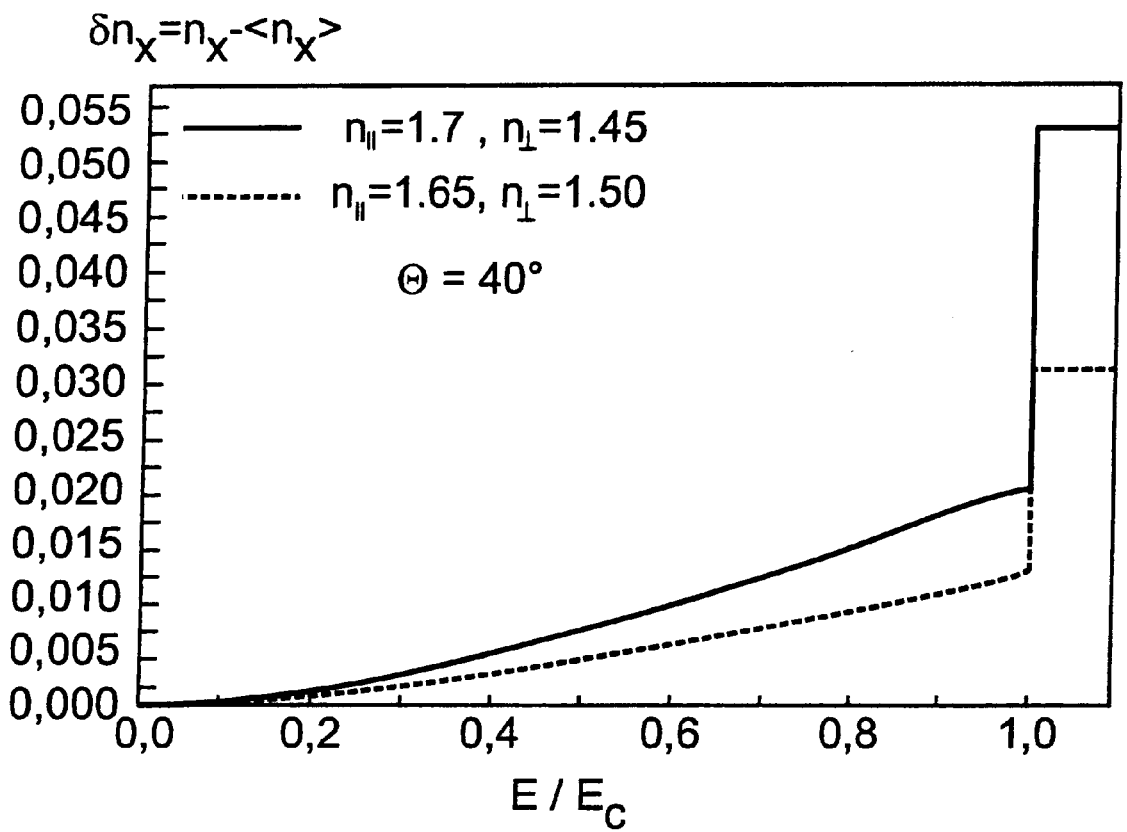
FIG. 9 shows an exemplary structure of a dimer molecule and the arrangement of the molecules within a layer.
Figure 10:
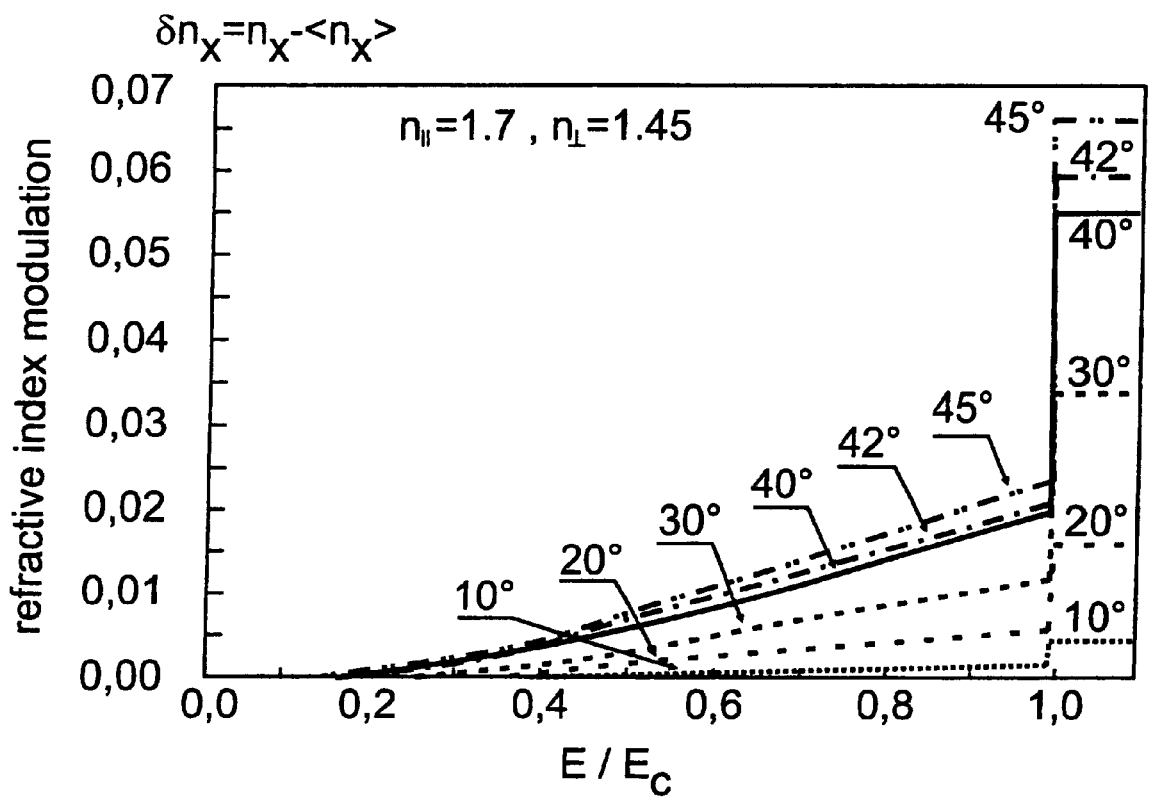
FIG. 10 shows another exemplary structure of a dimer molecule and the arrangement of the molecules within a layer.

In FIGS. 9 and 10, the numerically calculated dependency of refractive index difference $\delta n_x$ on an electric field applied along the y-axis is shown for various inclination angles θ. At field strength $E_C$, there is a sudden change to that of the completely unwound helix. Below threshold value $E_C$, a continuous field strength dependency of $n_x$ is discernible. The size or extent of the continuously variable range is more or less proportional to inclination angle θ. For the range φ=40° to 45°, $n_x$ can be continuously tuned up to 0.02. This means that, given a wavelength of 0.63 µm, a continuous phase shift over a phase angle 2π requires a 30 µm thick liquid crystal layer. If the cell is run through twice, for example due to the use of a mirror, a thickness of 15 µm suffices for the desired maximum phase shift of 2π. In the case of a non-continuous switching between an undeformed and completely unwound helix, $\delta n_x$ reaches values of 0.053 to 0.63. Thus, to achieve a phase modulation of 2π, liquid crystal layers having thicknesses of 10 µm suffice for a simple transmission, and of 5 µm for a double transmission through the phase modulator.

Figure 11:
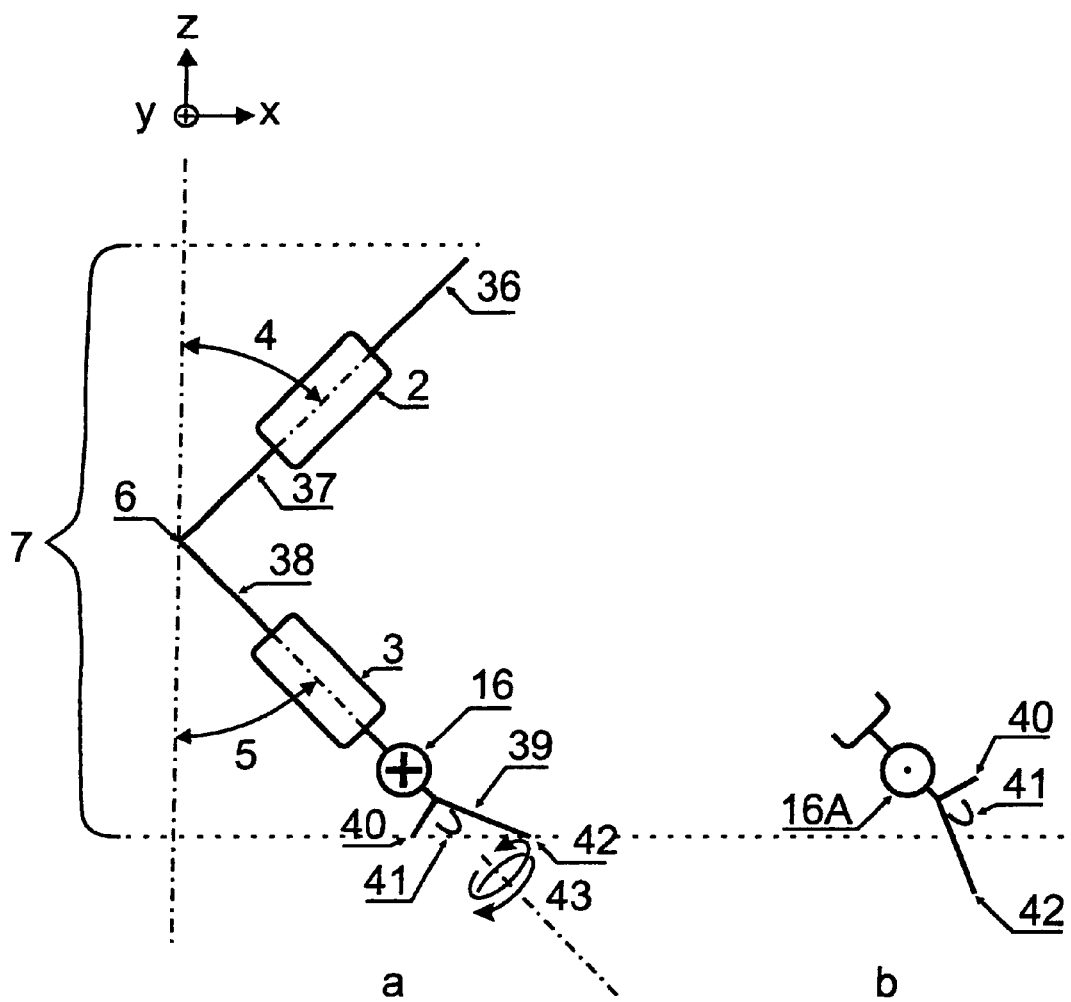
FIG. 11 shows another exemplary structure of a dimer molecule and the arrangement of these molecules within a layer.
Figure 12:
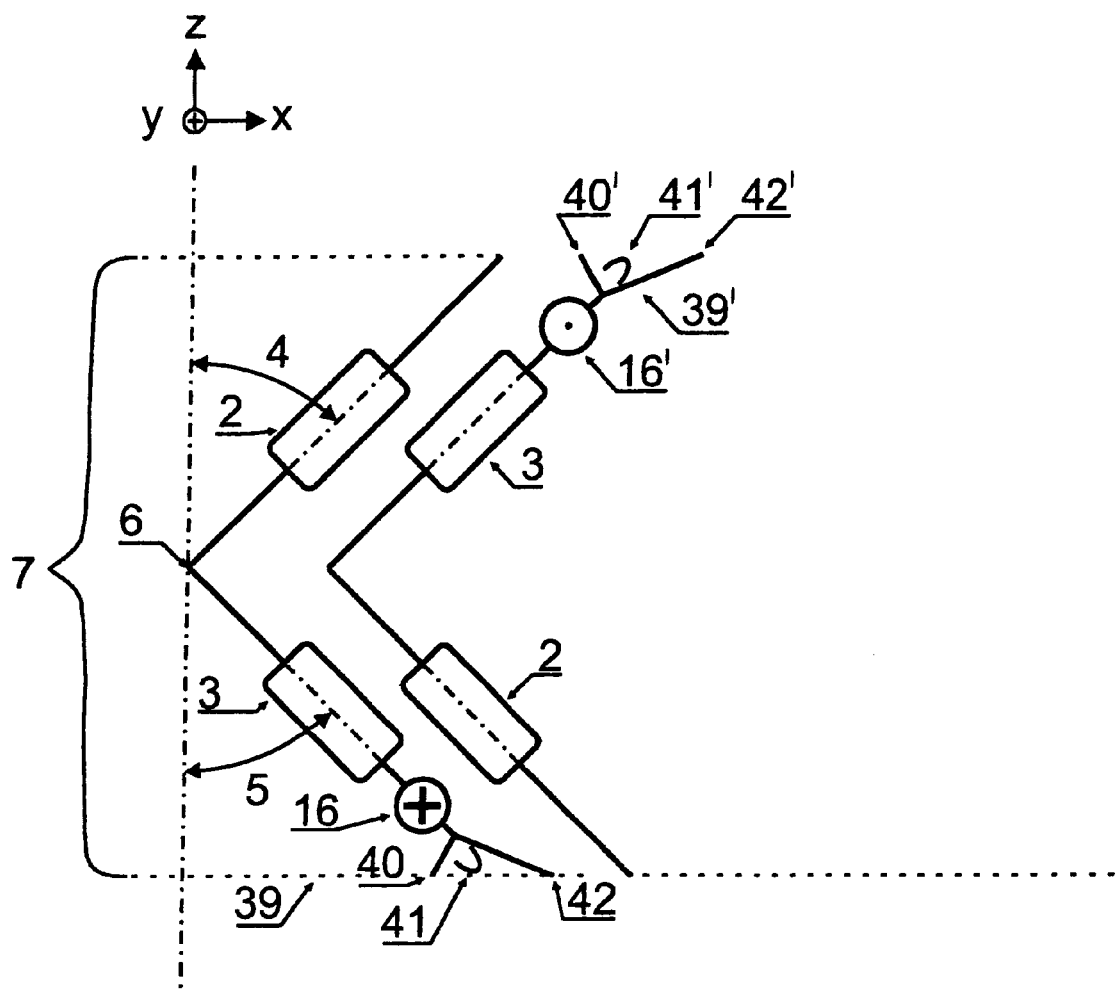
FIG. 12 shows a make-up of an exemplary ferroelectric superstructure.

An exemplary embodiment of the structure of the arcuated or angular dimer molecules of the liquid crystal of the present invention proceeds from FIG. 11, in which three dimer molecules are shown to clarify the relative position of individual molecules in one layer. In the discussed specific embodiments of the present invention, rigid central groups 2 and 3 are selectable among all available molecular fragments which were previously used for the synthesis of liquid crystals. These may include, for example, phenyls, phenylpyrimidines, pyridines, terphenyls, biphenyls, biphenylpyrimidines, and any other aromatic and/or polycyclic molecular fragments. The molecular fragments employed as optically anisotropic, rigid central groups 2 and 3, which are characterized by the molecular refractive indices $n_{\parallel\ and\ n\perp}$, determine the optical properties of the liquid crystal in the visible range of the spectrum. Aliphatic chains 36, 37 and 38 are used to bond central groups 2 and 3, and/or are used as a wing group, and are, for example, hydrocarbon chains of the form $-(CH_2)_n-$, in which case n may assume the values from 0 to 16. The opposite inclination of central groups 2 and 3 results in the formation of an angle apex 6. In a further embodiment of the present invention, the angle apex may also be formed as a ring or annular structure. Outside of a rigid center, for example, in one of the wing groups, the dimer molecules shown in FIG. 11 may exhibit a chiral group 39 and a lateral dipole moment 16, allowing for azimuth angle 8, 9 of vertex 6 of molecules 1 to be controlled by an electric field. See, for example, FIG. 1. In the exemplary embodiment of FIGS. 11 and 12, chiral group 39 (39') includes a tripod of molecular chains 40 (40'), 41 (41'), and 42 (42') of different lengths. A preferred orientation of transverse dipole moment 16 (16') may result from the restriction of the rotational or libration movement about the longitudinal axis of the subunit, which is made up of parts 38, 3, 16, and 39. If such a molecule is located in a smectic layer 7 in the xz-plane, the dipole moment is, for example, oriented in the y-direction, since the libration movements of the subunits about their longitudinal axes are restricted. This restriction may be associated with the monoclinic symmetry of the area surrounding chiral center 39 and is discussed, for example, in "Ferroelectric Liquid Crystals", R. B. Meyer et al., J. Physique (Lett.), volume 36, page L69, 1975. The molecular residues 40, 41 and 42 for forming the chiral center may have different lengths and may be three different aliphatic and fluorinated fragments, such as $-C^*H(CH_3)\ C_nH_{2n+1}$ or $-C^*H(CF_3)\ C_nH_{2n+1}$, n being a value from 2 to 8. Because of the preferred orientation of the chiral center as shown in FIGS. 11 and 12, the transversal component of dipole moment 16 associated with this chiral center 39 may be oriented in parallel to the normal of the plane in which the angular molecule is situated. Accordingly, dipole moment 16 is oriented in parallel to the y-axis. The dipole moments can be introduced by various polar groups, e.g., $-CO-O-$, $-CO-CF_3$.

Figure 13:
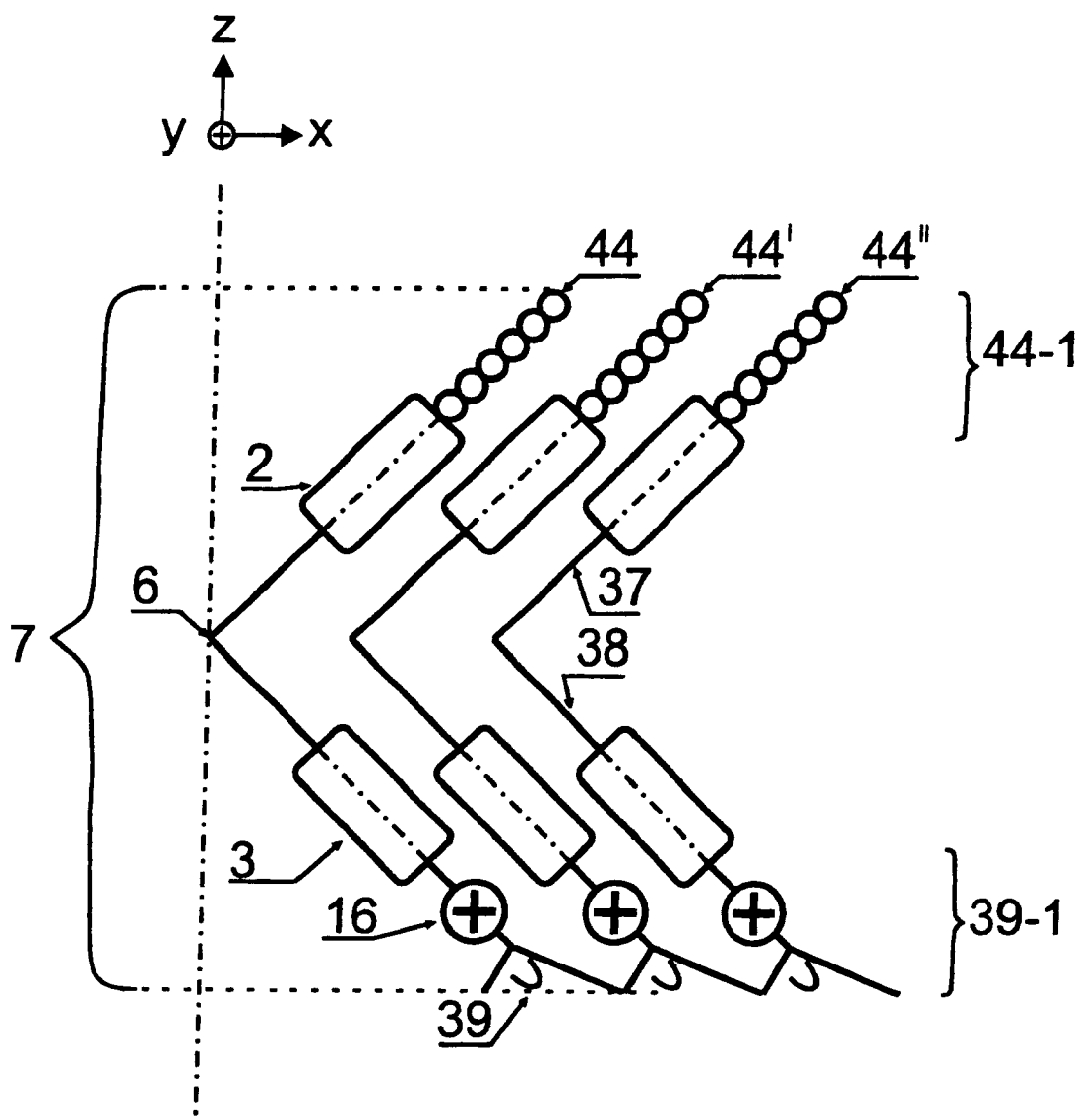
FIG. 13 shows a make-up of an exemplary antiferroelectric superstructure.

When the arcuated dimer molecules are constructed from two central groups 2 and 3, from aliphatic chains 36, 37, 38, and from a chiral center 39 having dipole moment 16, there may be a mutual compensation of the dipole moments of two molecules, when both dimer molecules have opposite orientations. Both possible orientations are energetically equivalent and, therefore, on the average, are occupied with the same rate of occurrence. Since the dipole moments of both orientations have opposite signs, no spontaneous polarization is expected to occur. To prevent this opposite orientation of various dimer molecules, the molecules have at least one polyphilic fragment that is positioned asymmetrically to the vertex of the molecule. FIG. 13 shows the three dimer molecules, each may have a heterophilic group 44, 44' or 44", which may be bonded as a wing group to the respective central group 2. In FIG. 13, the mentioned heterophilic groups are formed by an at least partially fluorinated chain, for example, by a perfluorinated chain of the structure $-(CF_2)_n-$ where n=4 to 16, which at least partially replaces the aliphatic chains 36, 37 or 38 in the molecule. As a result of such a replacement, the two possible molecular orientations for adjacent molecules within one layer 7 may no longer be energetically equivalent, and an orientation in which the fluorinated groups are adjacent may be desired. These form a sublayer 44-1, which prevents the flip-flop motion of the molecules within smectic layer 7. As a consequence, a sublayer 39-1 of chiral groups 39 may also be formed. The preferred parallel orientation of transverse dipole moments 16 at the chiral groups may prevent them from being compensated, so that a spontaneous polarization occurs. The introduction of fluorinated chains further allows a greater optical tilt angle θ as compared to the smectic C-phase of analog molecules. On the other hand, inclination angle $θ_F$ of the fluorinated chain is smaller than optical tilt angle θ because of the larger cross-sectional area of the fluorinated chains.

Figure 14:
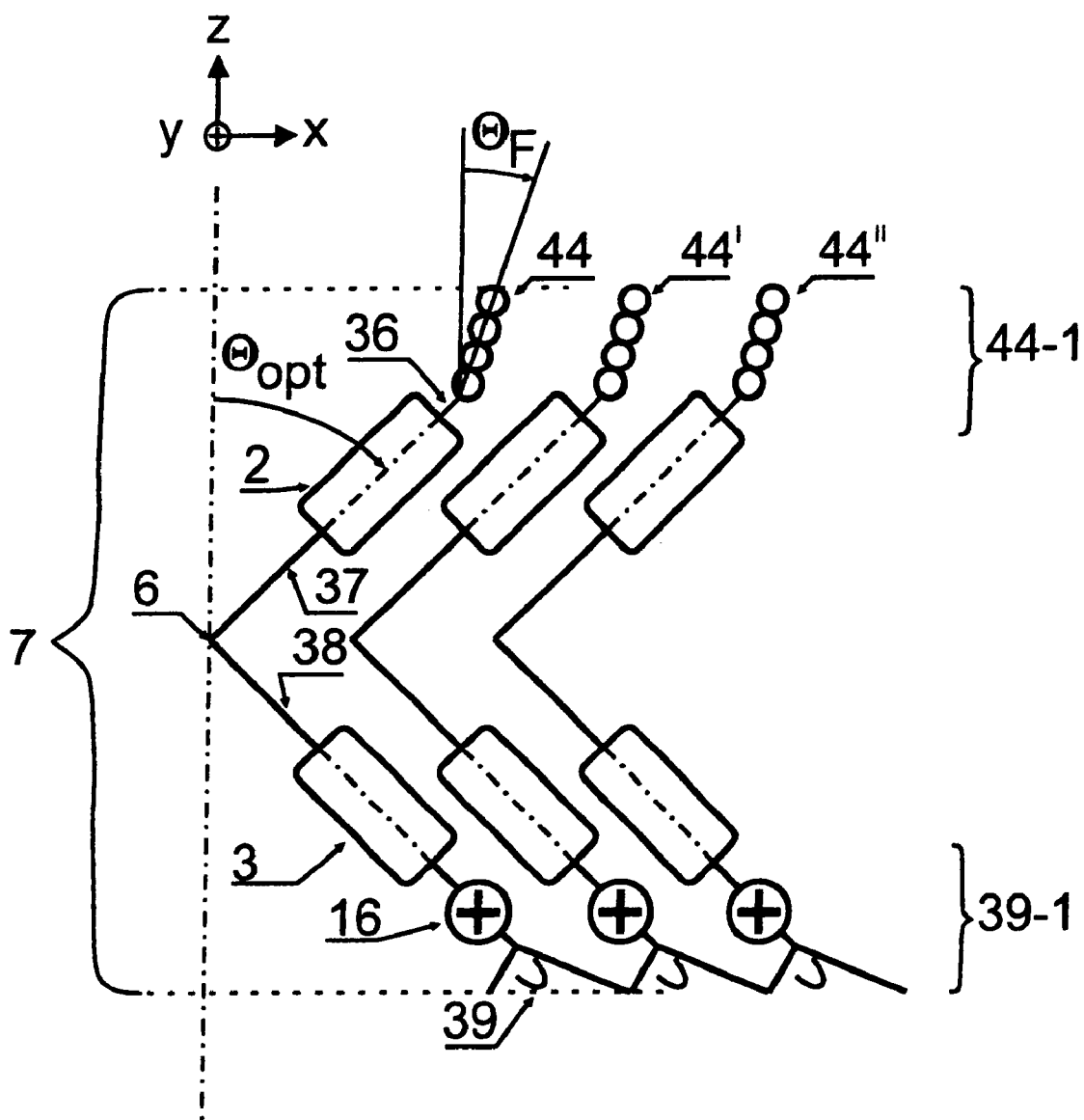
FIG. 14 shows another exemplary ferroelectric superstructure having dimer molecules, which exhibit two chiral centers.
Figure 15:
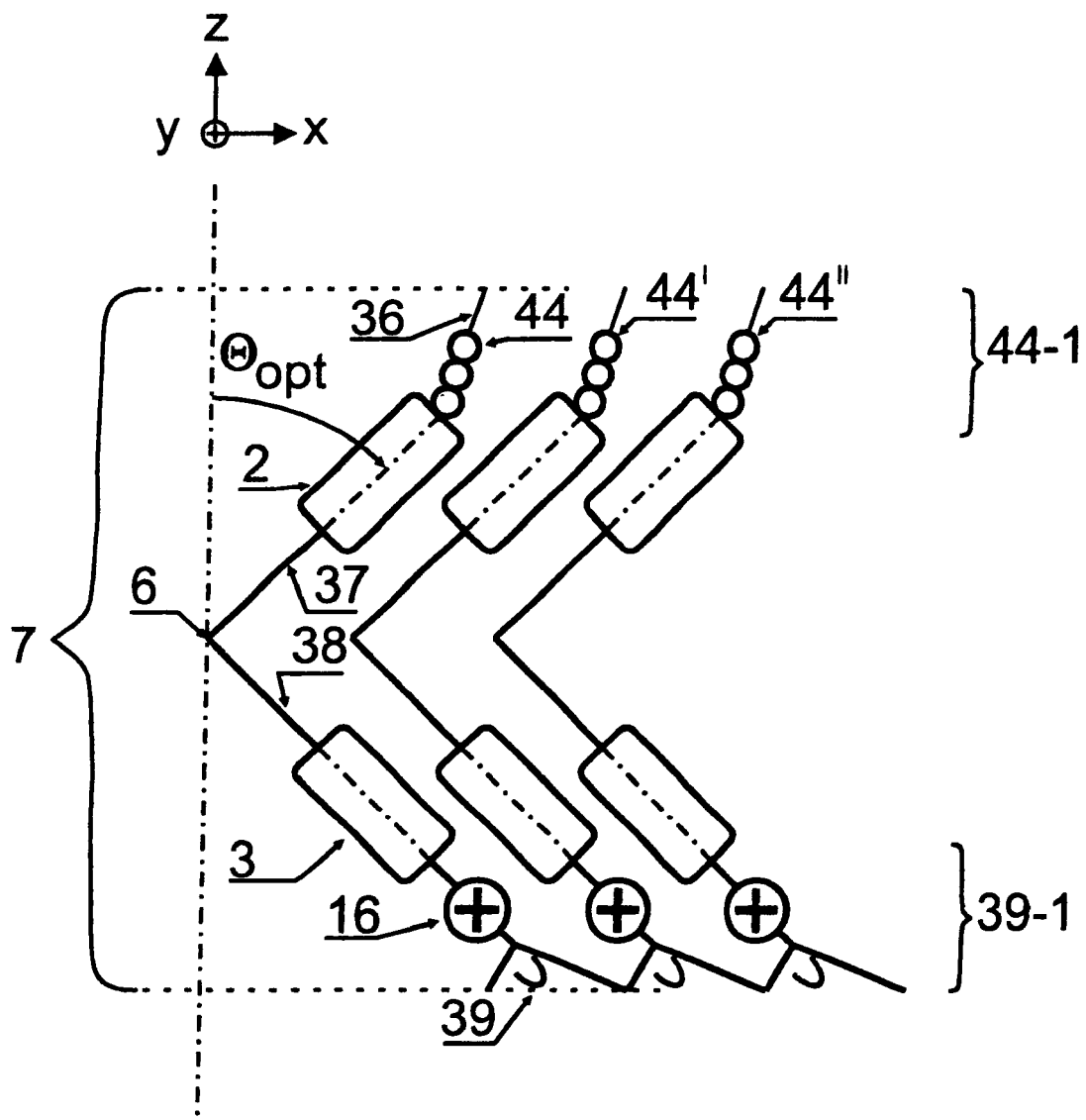
FIG. 15 shows a make-up of another exemplary antiferroelectric superstructure.
Figure 16:
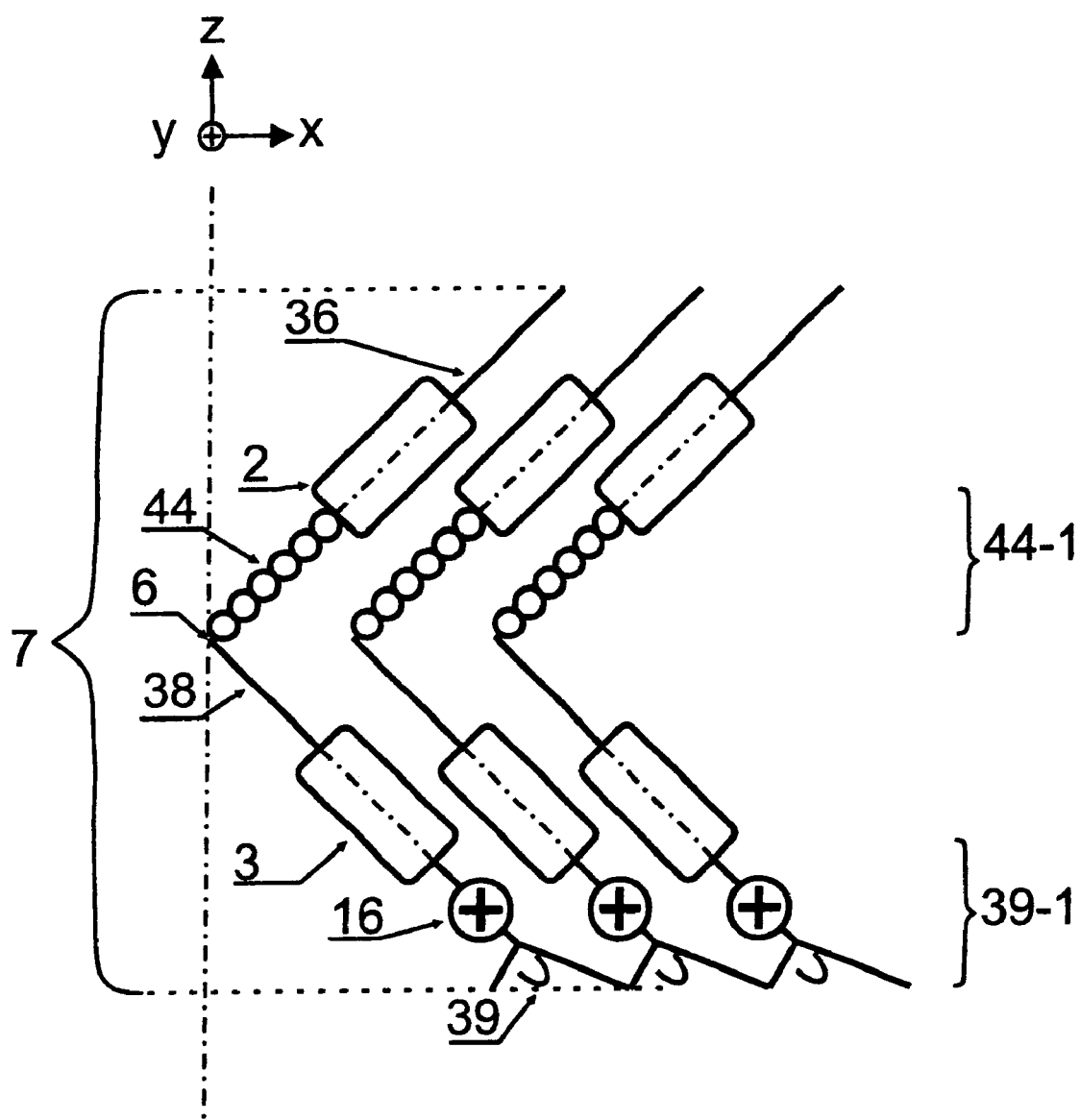
FIG. 16 shows an exemplary phase modulator that may use the liquid crystalline material of the present invention.
Figure 17:
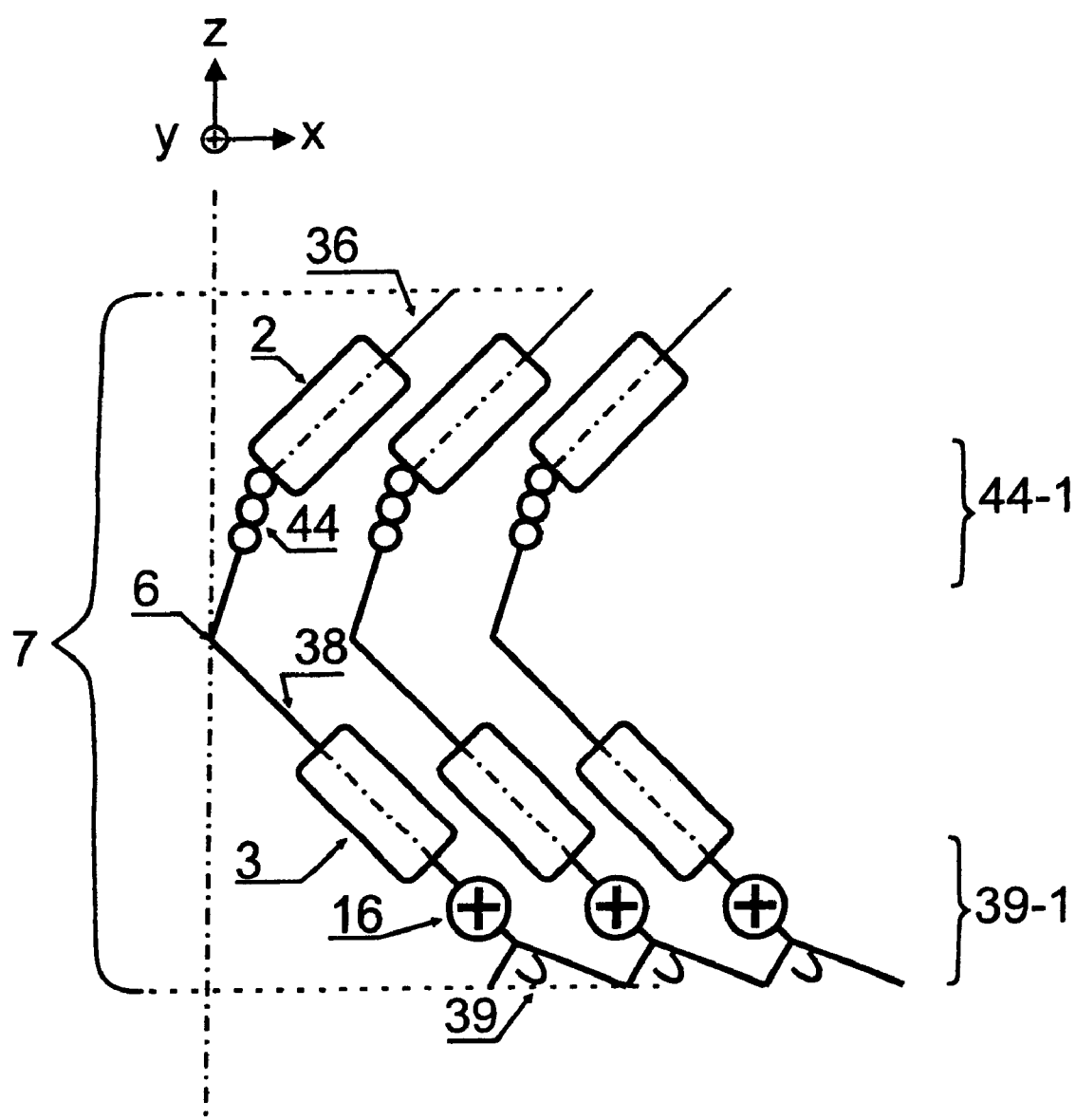
FIG. 17 shows an exemplary phase modulator that may use the liquid crystal of the present invention and which is optically addressable through the use of a photoconductor.
Figure 18:
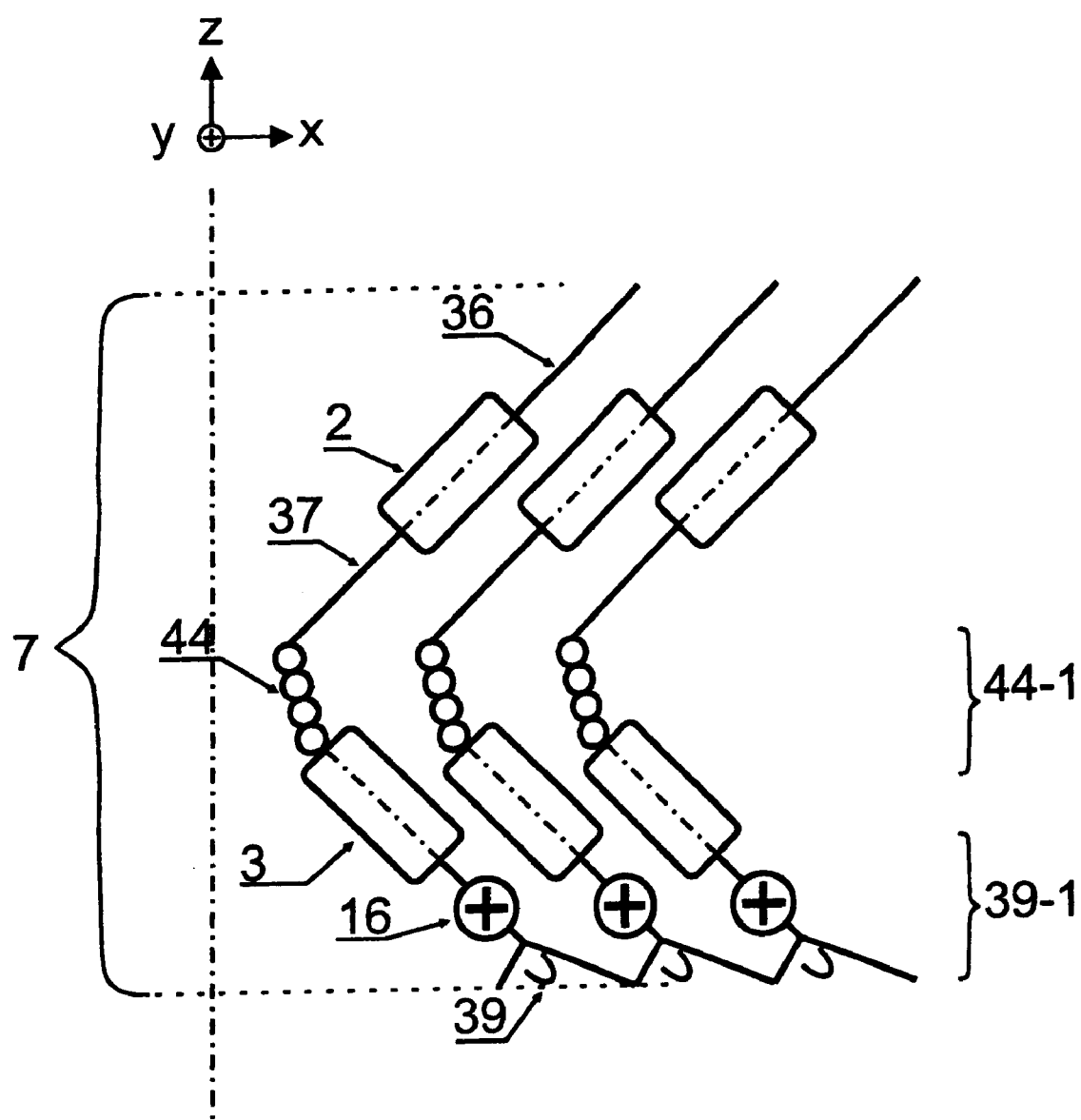
FIG. 18 shows another exemplary phase modulator that may use the liquid crystalline material of the present invention.
Figure 19:
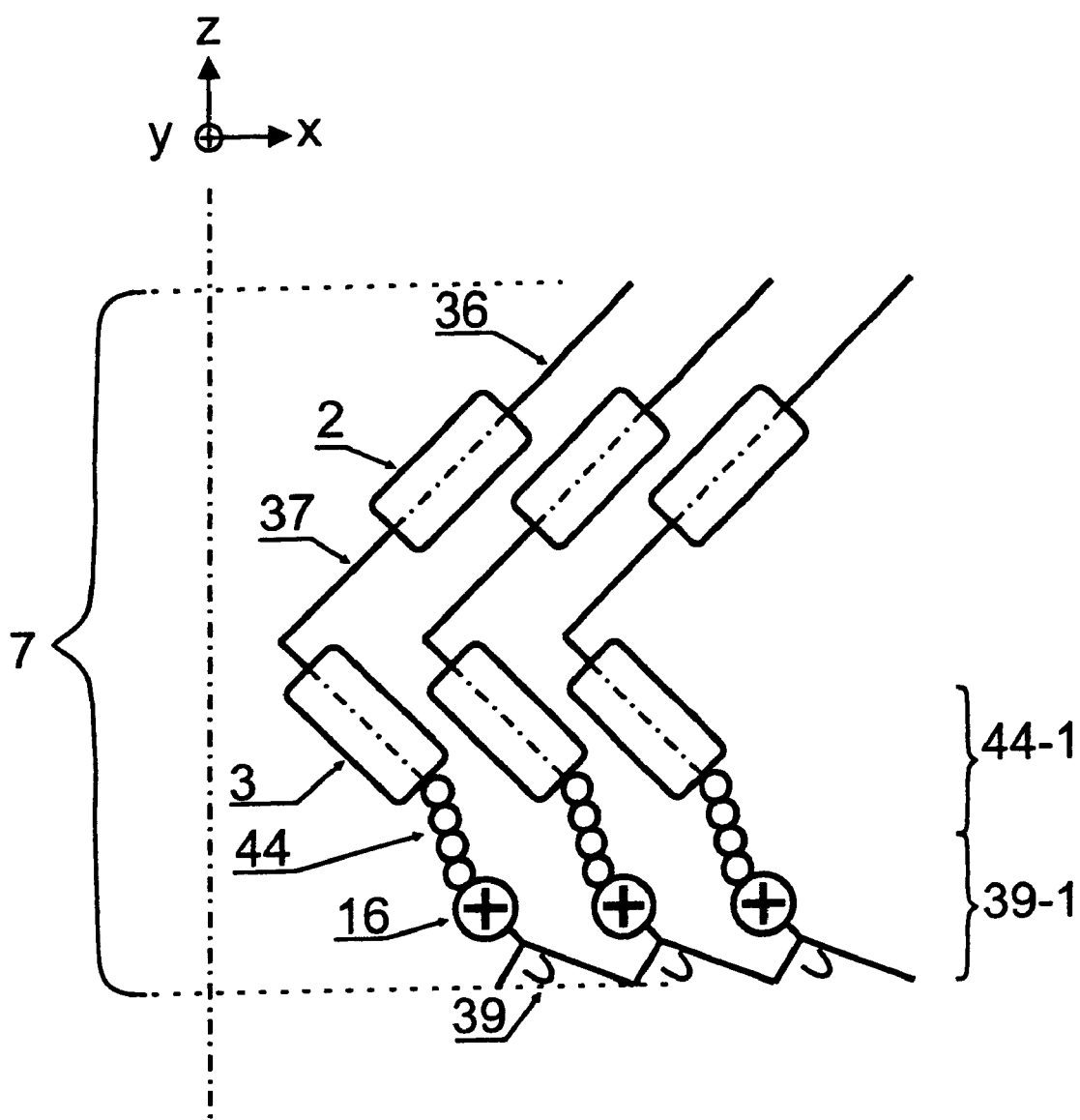
FIG. 19 shows another exemplary phase modulator that may use the liquid crystalline material of the present invention.
Figure 20:
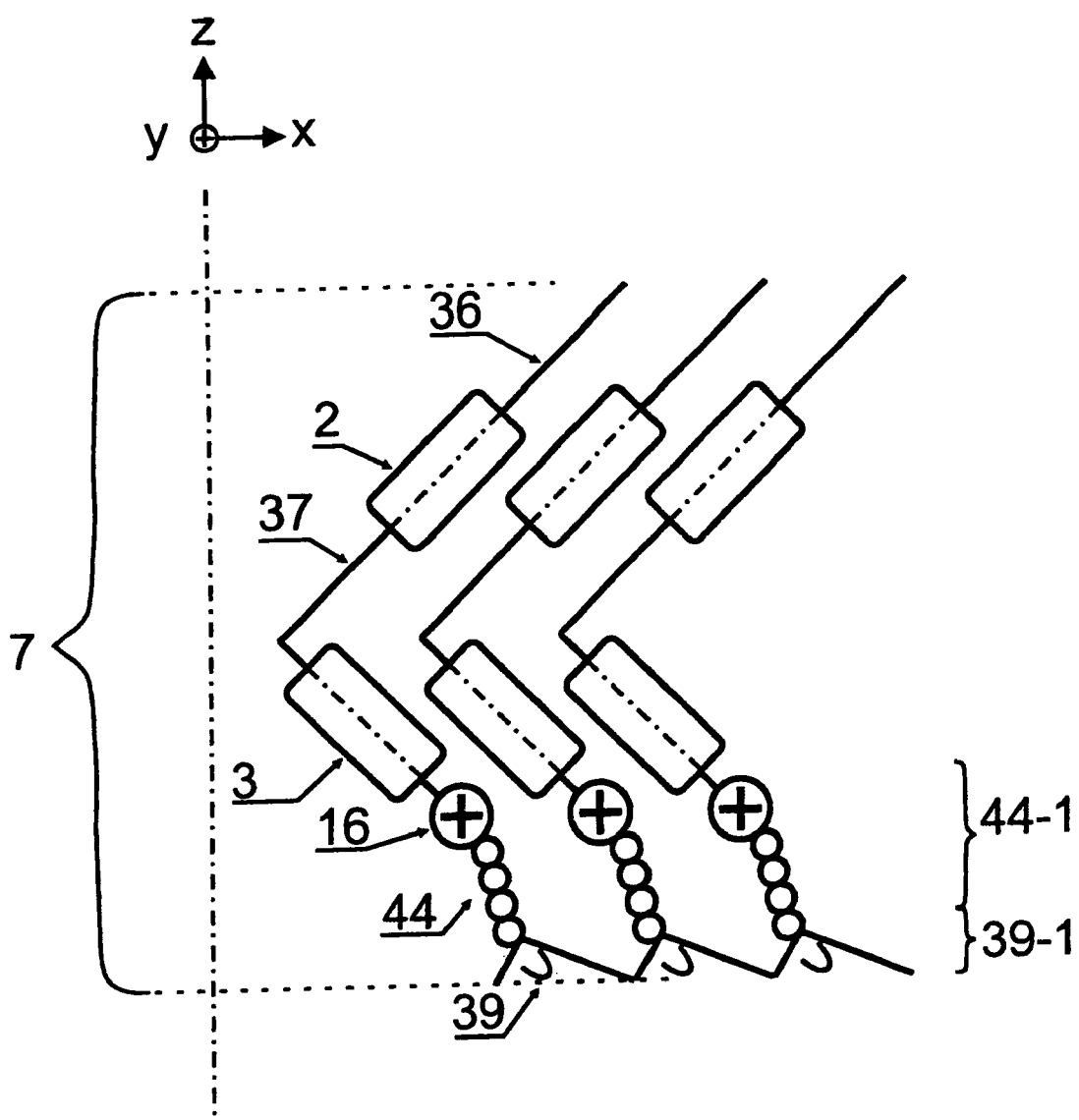
FIG. 20 shows another exemplary phase modulator that may use the liquid crystalline material of the present invention.
Figure 21:
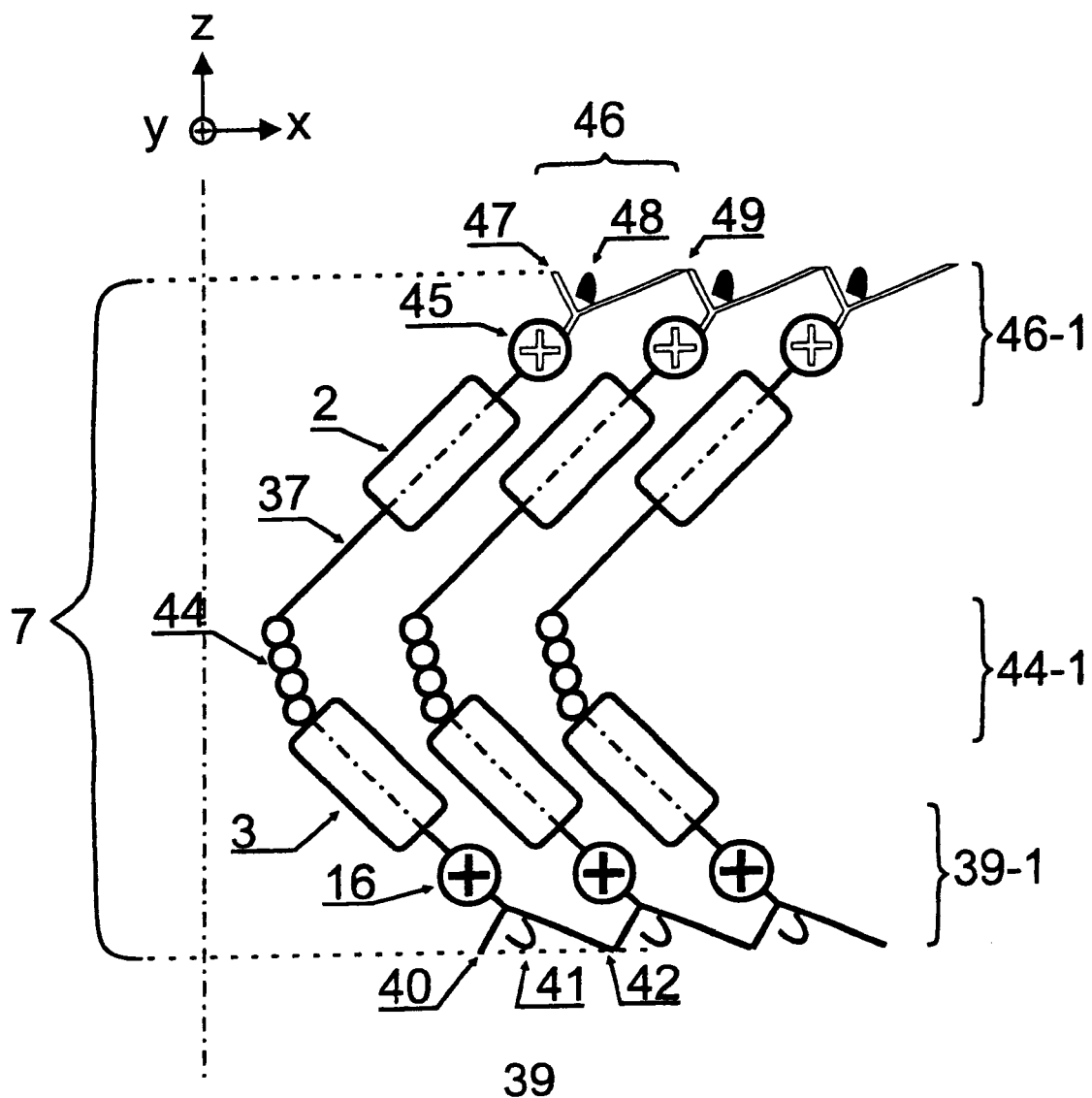
FIG. 21 shows another exemplary phase modulator that may use the liquid crystalline material of the present invention.
Figure 22:
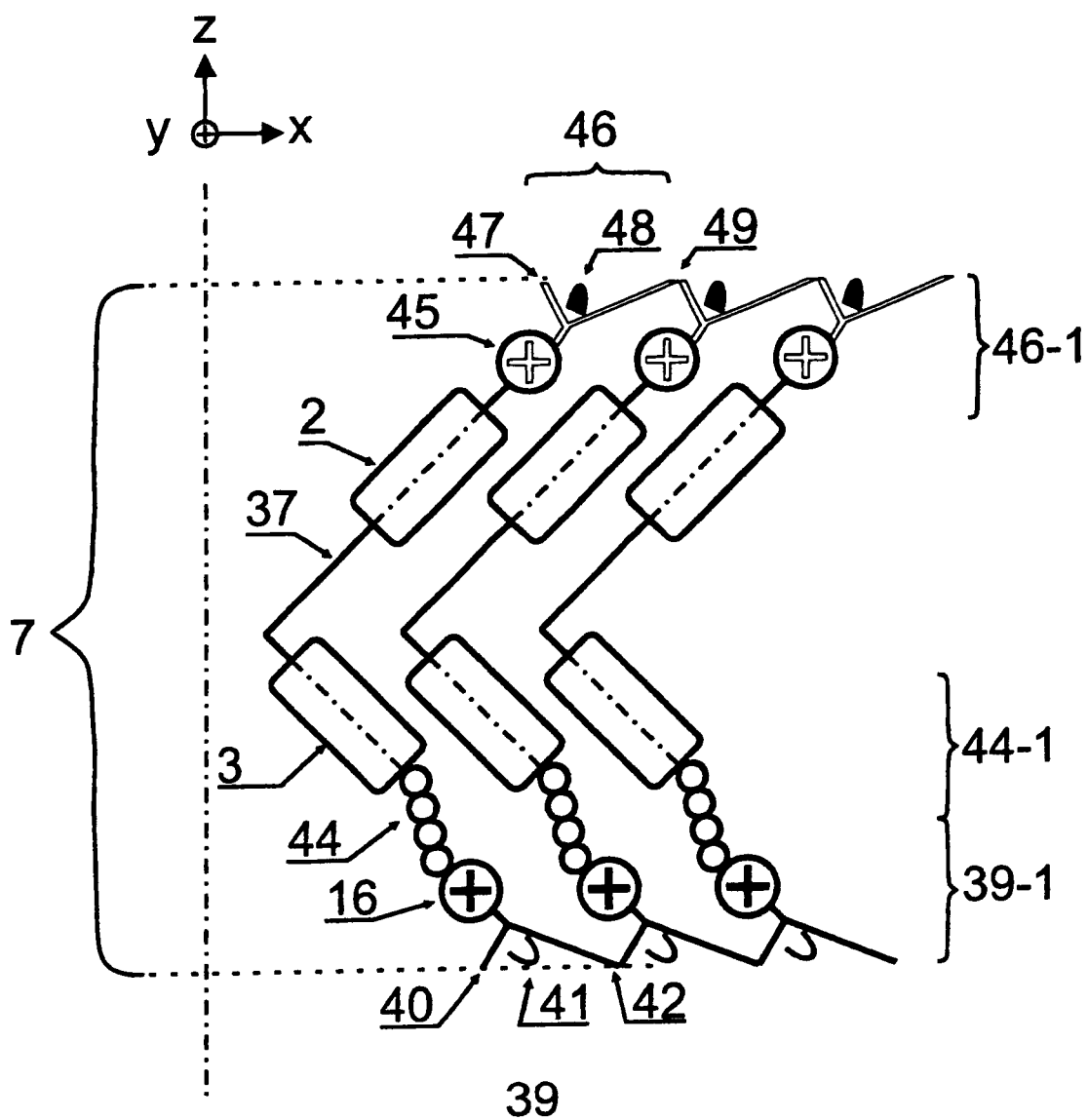
FIG. 22 shows another exemplary phase modulator that may use the liquid crystalline material of the present invention.

Depending on the specific embodiment of the present invention, referring to at least FIGS. 14 through 22, the polyphilic group in the form of the fluorinated chain can be positioned in diverse ways within the arcuated dimer molecule. Some exemplary embodiments select an asymmetrical position for the fluorinated chaing with respect to the vertex. In FIG. 18, perfluorinated chain 44 may be disposed between central group 3 and the apex. The dimer molecule formation again may produce a stabilizing sublayer 44-1, which results in a spontaneous polarization in layer 7. In FIGS. 20 and 21, the perfluorinated group is intercalated between the group carrying dipole moment 16 and chiral center 39. Referring to FIGS. 14 and 15, the perfluorinated chain 44 may be configured outside of central units 2 and 3 instead of between them, due to the greater polyphilic asymmetry obtained and the resultant greater separation of fluorinated molecular components 44, 44', 44". See also, for example, FIG. 13. In FIGS. 16 and 17, the perfluorinated chain is configured between the central unit 2 and the apex. In FIGS. 19 and 22, the perfluorinated group is configured between the central unit 3 and the group carrying dipole-moment 16.

Figure 23:
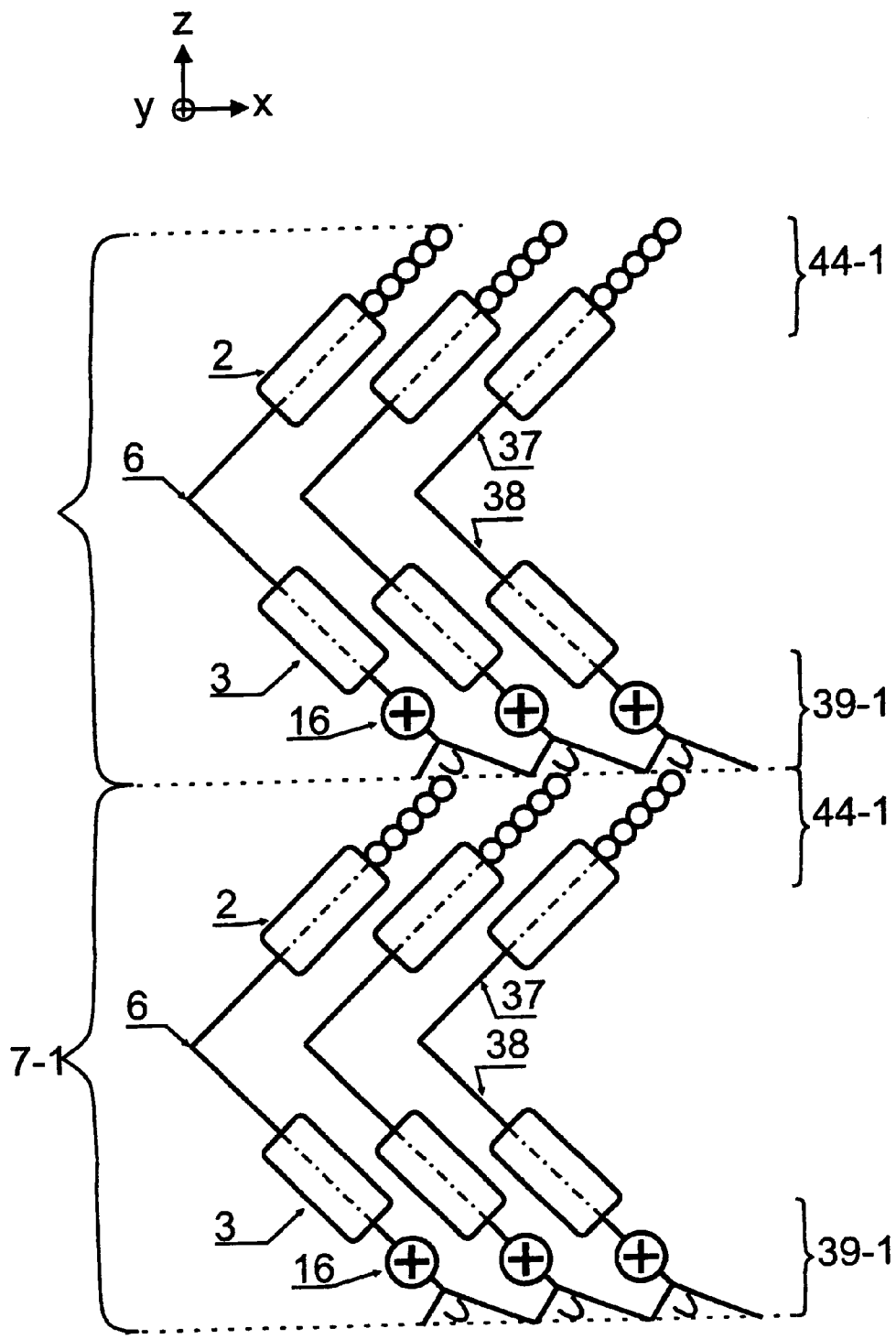
FIG. 23 shows another exemplary phase modulator that may use the liquid crystalline material of the present invention.
Figure 24:
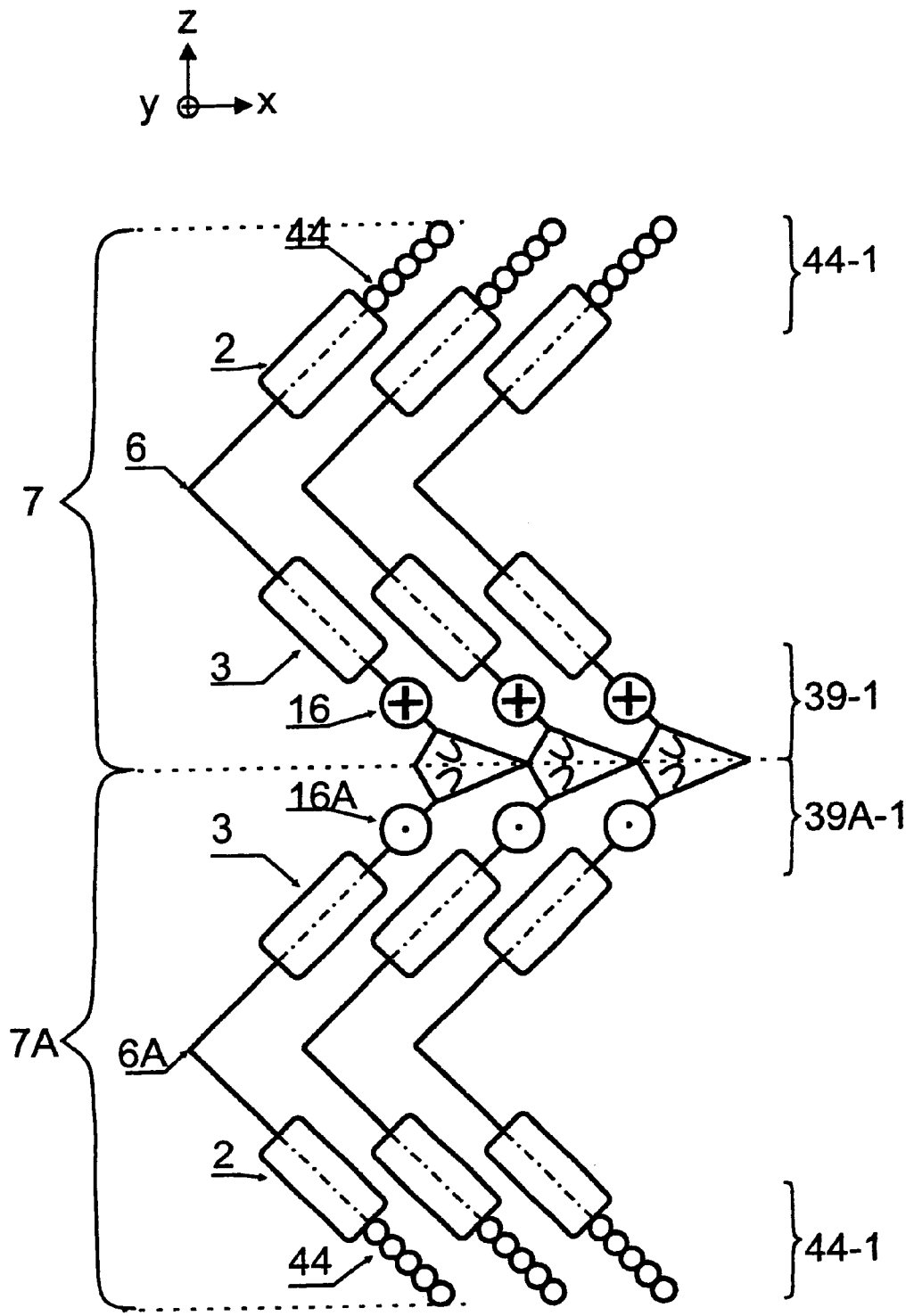
FIG. 24 shows another exemplary phase modulator that may use the liquid crystalline material of the present invention.
Figure 25:
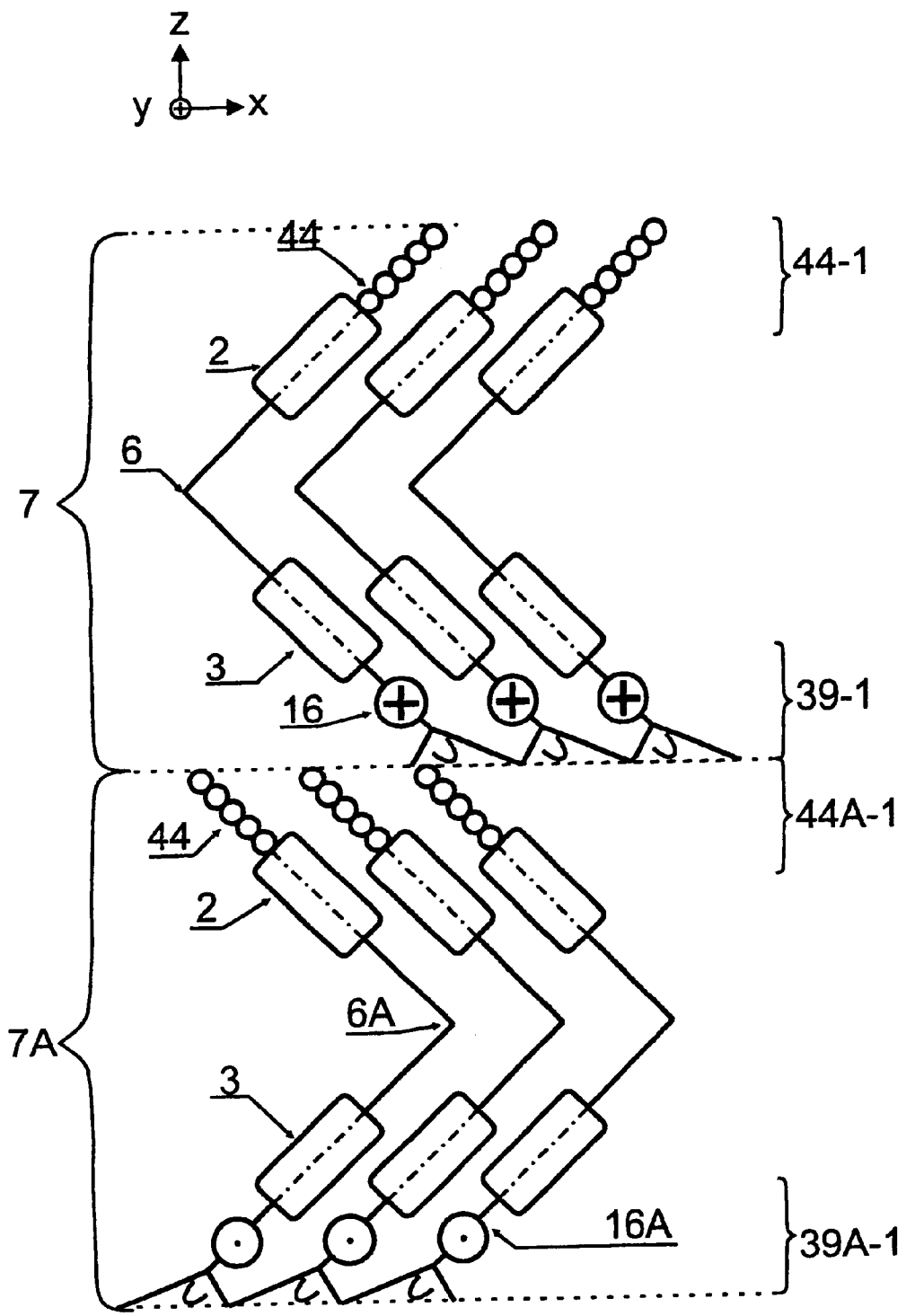
FIG. 25 shows another exemplary phase modulator that may use the liquid crystalline material of the present invention.

Lamellar, for example, smectic layers 7 of the liquid crystalline material according to the present invention, having arcuated or angular molecules may possess both a ferroelectric superstructure, in which the average transverse dipole moments of adjacent layers exhibit at least approximately the same directions, as well as an antiferroelectric superstructure, in which the average transverse dipole moments of adjacent layers are rotated by about 180° with respect to one another about the z-axis. A first ferroelectric superstructure is shown in FIG. 23, the polyphilic group being coupled as a wing group to central unit 2. Vertices 6 of adjacent layers 7 and 7-1 point more or less in the same direction. The net dipole moments of the individual dimer molecules accumulate to the point of spontaneous polarization. An example of an antiferroelectric superstructure is shown in FIG. 24. Vertices 6 and 6a of adjacent layers 7 and 7a point more or less in the same direction. The net dipole moments of adjacent layers point, in this instance, more or less in the opposite direction. In FIG. 25, a further antiferroelectric superstructure is shown, in which, as in FIG. 24, the polyphilic group is coupled as a wing group to central unit 2. In this example, vertices 6 and 6a of adjacent layers are oppositely directed, just as are the corresponding net dipole moments.

The optical properties of the depicted ferroelectric and antiferroelectric structures are the same when the helical pitch of the structure is smaller than the wavelength of the light. Under the influence of an electric field in the y-direction, the main axes of the index ellipsoid do not change their direction, and merely a variation in the average refractive index $<n_x>$ occurs. Therefore, when an electric field is applied in the y-direction, only that portion of the light propagating in the y-direction which is polarized in the x-direction is phase-modulated, without a polarization modulation additionally occurring.

Figure 26:
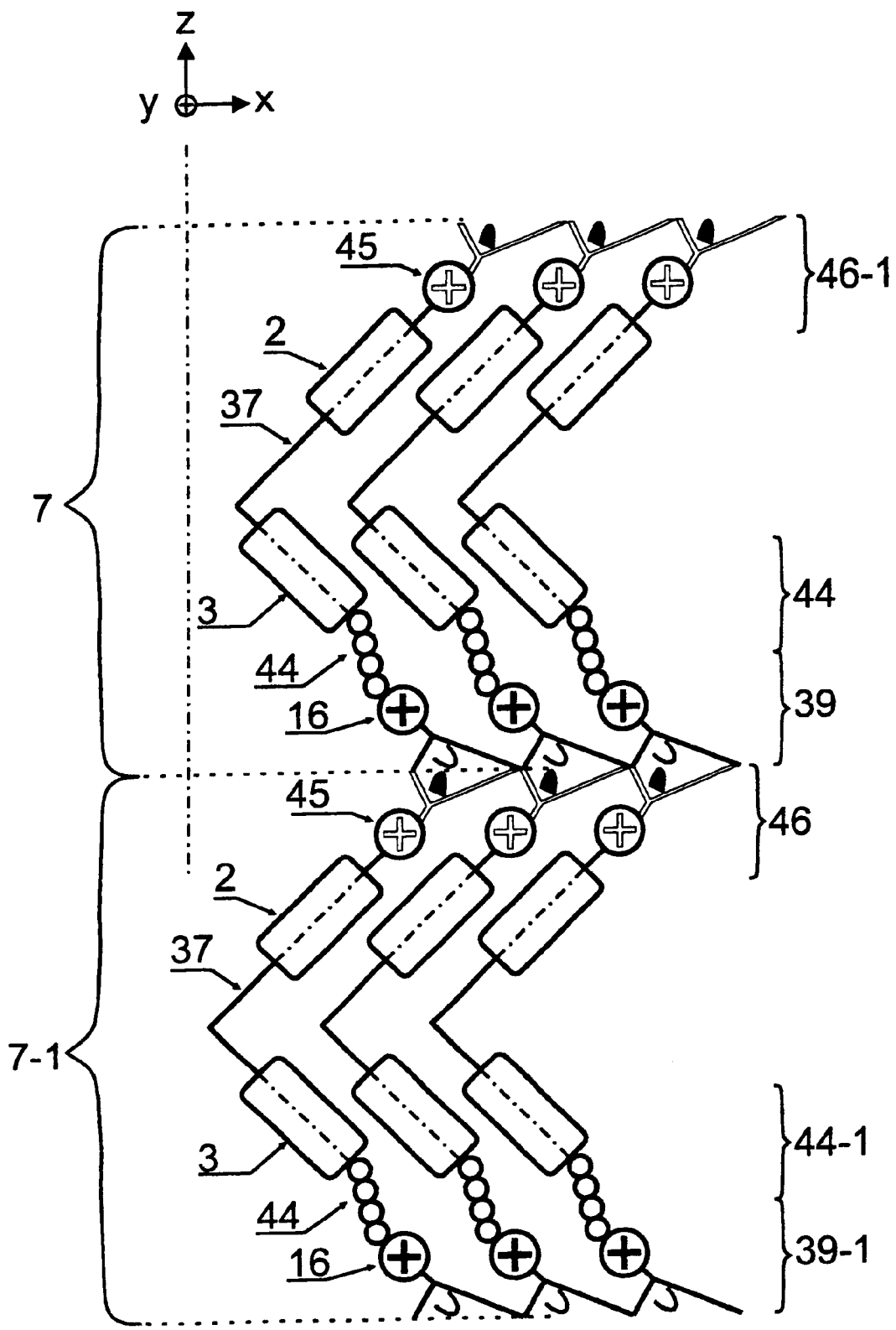
FIG. 26 shows another exemplary phase modulator that may use the liquid crystalline material of the present invention.
Figure 27:
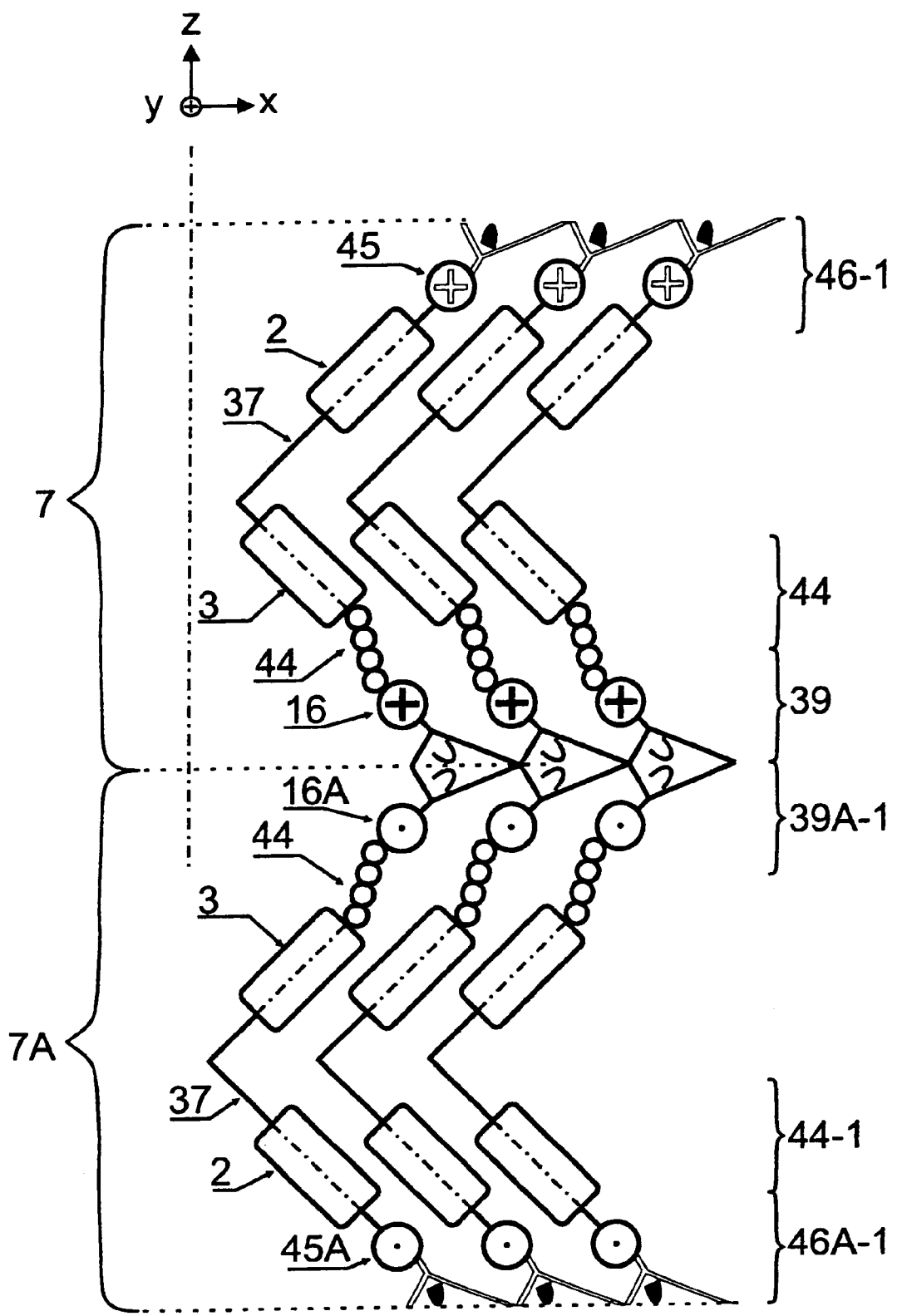
FIG. 27 shows another exemplary phase modulator that may use the liquid crystalline material of the present invention.
Figure 28:
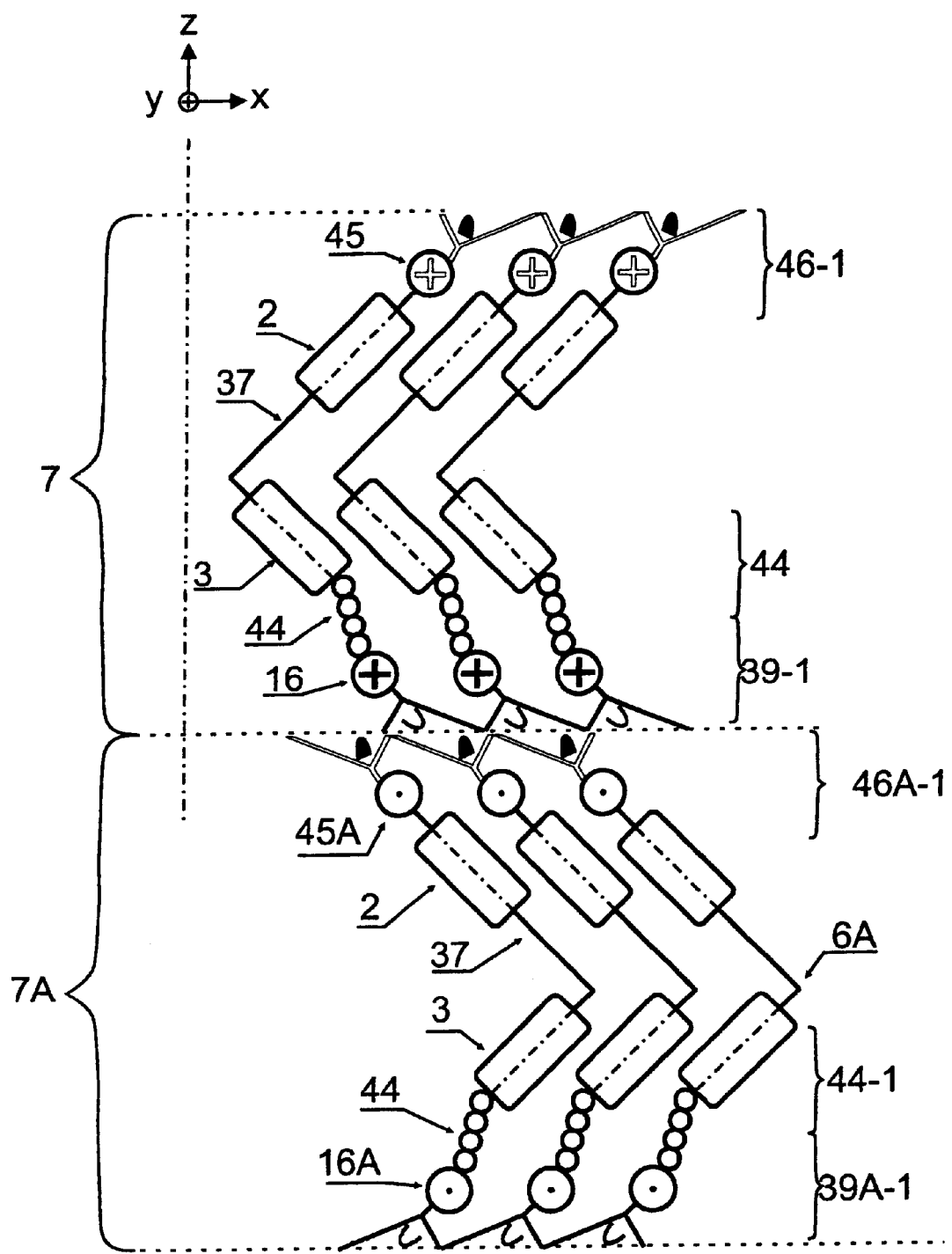
FIG. 28 shows another exemplary phase modulator that may use the liquid crystalline material of the present invention.

The spontaneous polarization and the pitch of the helical superstructure, which are substantially determined by chiral center 39 and transverse dipole moment 16, may be modified by intercalating a second group 46, which likewise may contain a chiral center and a transverse dipole moment, into the dimer molecules. FIG. 26 shows an example of a structure having polyphilic molecules, including two chiral centers 39 and 46 and two transverse dipole moments 16 and 45. Perfluorinated chain 44 is located between central group 3 and dipole moment-carrying group 16. The second chiral group 46 has a different form and/or a different transverse dipole moment. A different form may be achieved, for example, by employing different molecular fragments to form the chiral center. In another embodiment, transverse dipole moments 16 and 45 of both subunits point in the same direction, referring to FIG. 27, in which a ferroelectric superstructure may be formed. In another embodiment, referring to FIG. 28, a ferroelectric superstructure may also be formed.

Figure 29:
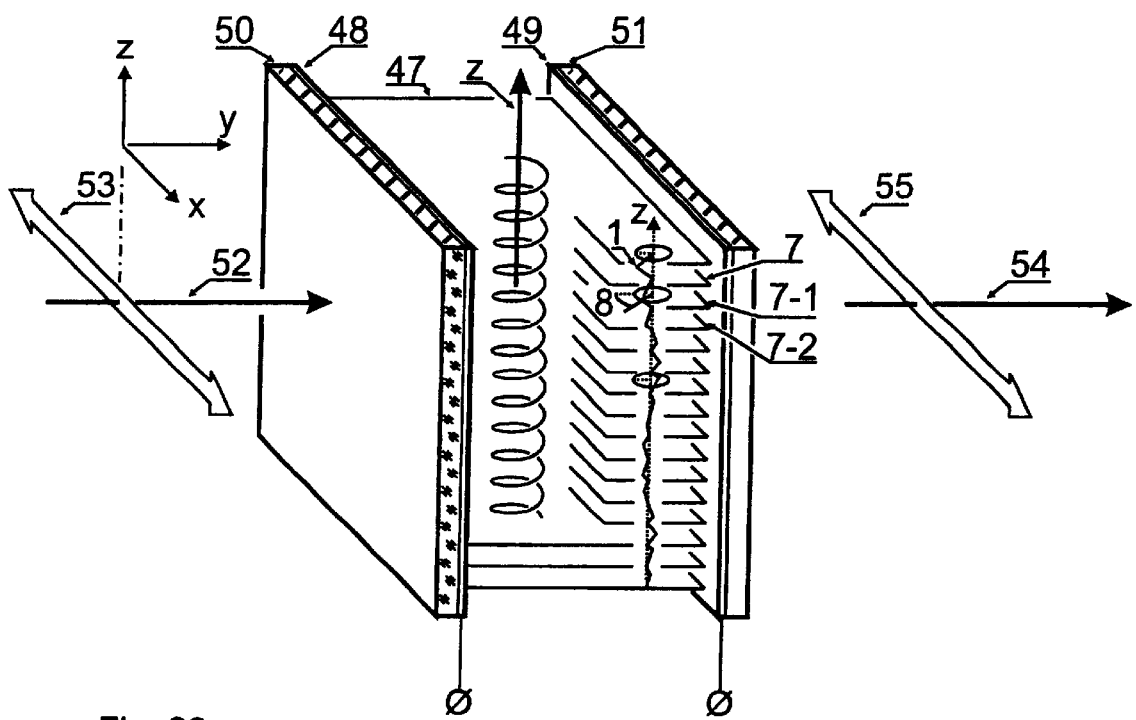
FIG. 29 shows another exemplary phase modulator that may use the liquid crystalline material of the present invention.
Figure 30:
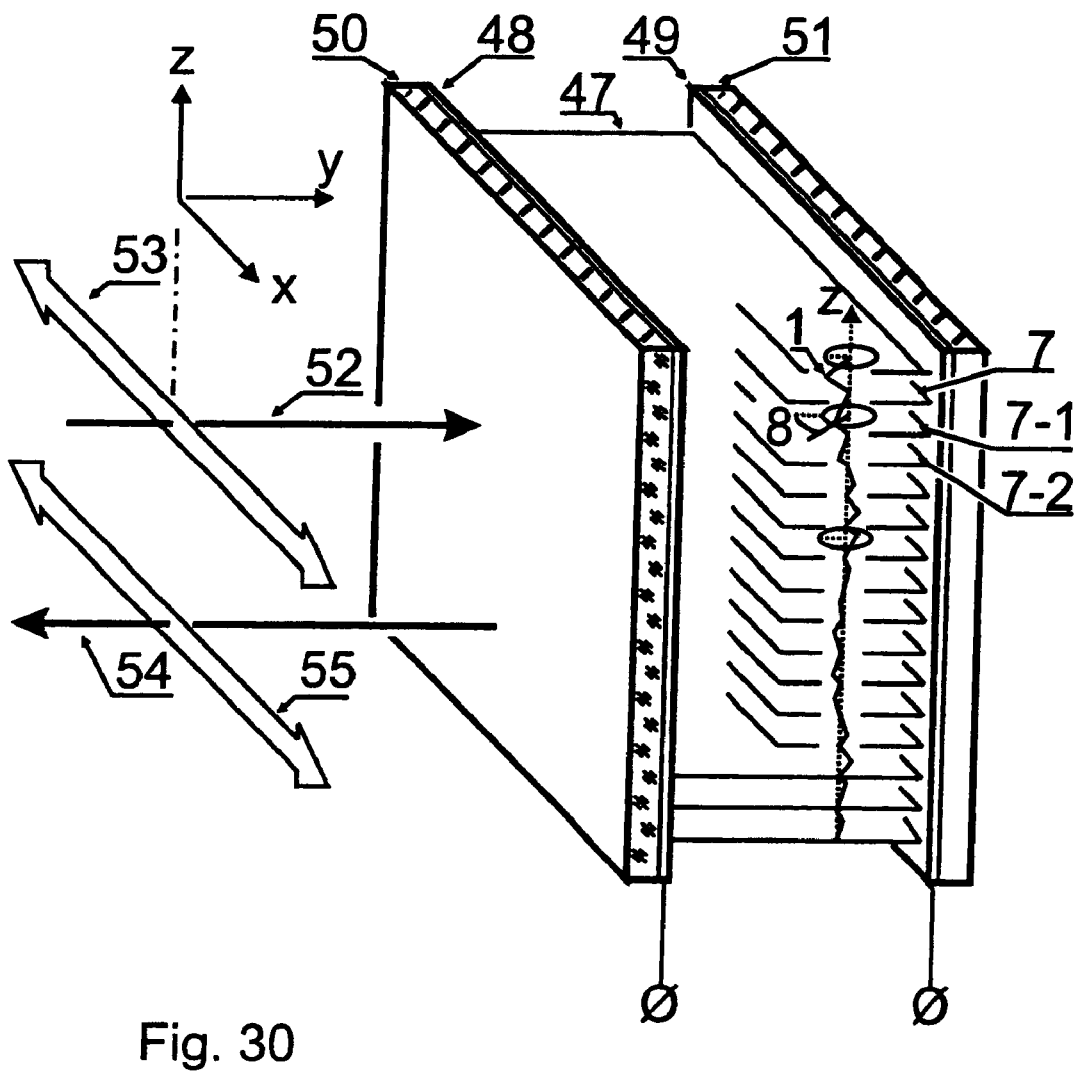
FIG. 30 shows another exemplary phase modulator that may use the liquid crystalline material of the present invention.

The liquid crystalline materials of the present invention may be suited for implementing various optical phase modulators, it being possible to prevent a simultaneously occurring polarization modulation. Referring to FIGS. 29 and 30, liquid crystal 47 of the present invention may be positioned between transparent electrodes 48, 49, which are vapor-deposited on glass surfaces 50, 51. The normal direction z of the helical layer structure runs orthogonally to irradiation direction 52. A voltage may be applied to the electrodes, thereby forming an electric field in parallel to the y-axis. Light falls on (or is incident with) a predefined linear polarization 53 in parallel to the x-axis and emerges from the phase modulator with polarization 55, both polarizations being identical. Through the action of an external electric field on the liquid crystal, the helix may be unwound, as described above, which results in a pure phase modulation of the light being transmitted through the phase modulator.

The polarization plane of the incident light conforms in this instance with the planes of the smectic layers, i.e., with the xy-plane.

Figure 31:
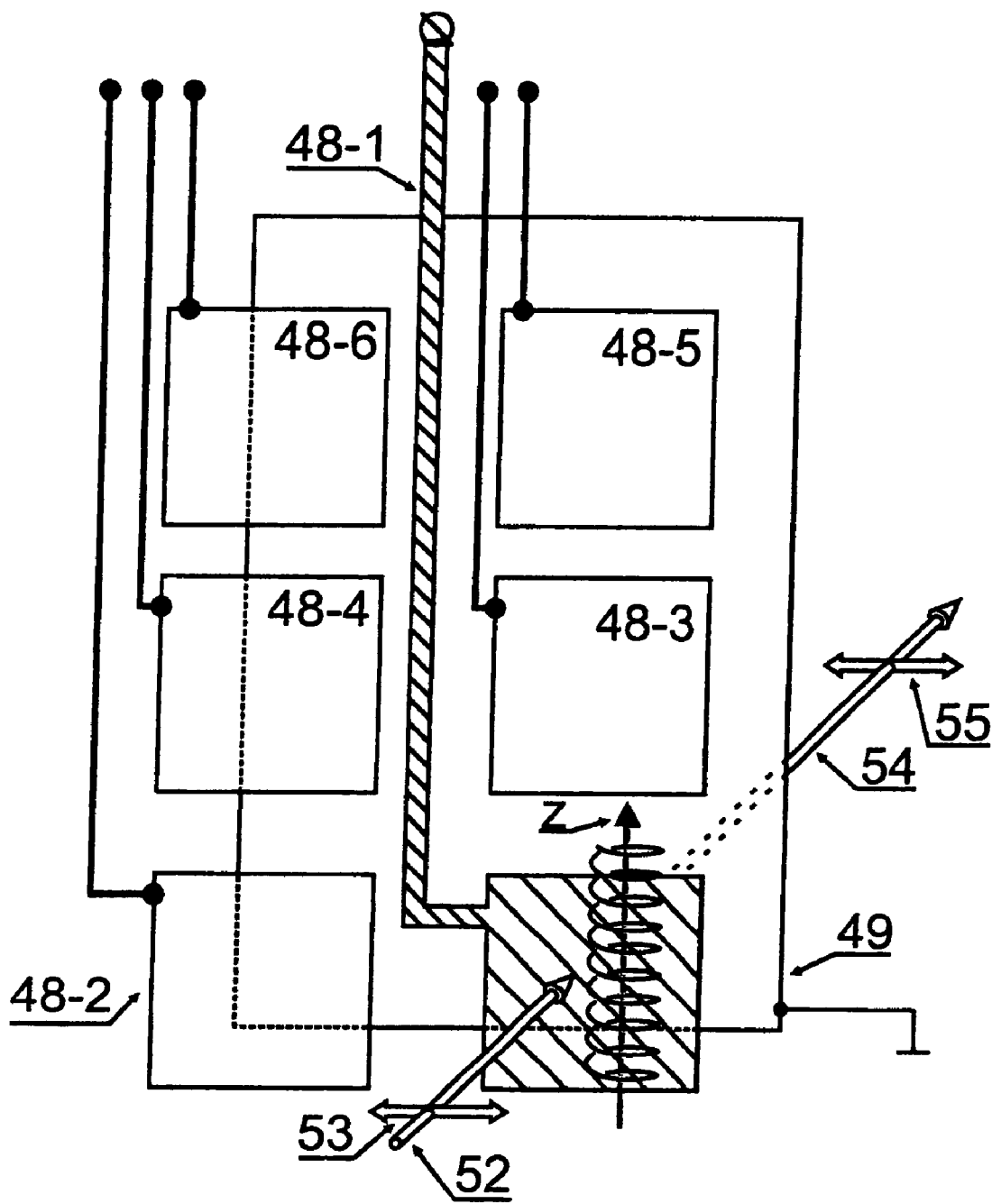
FIG. 31 shows another exemplary phase modulator that may use the liquid crystalline material of the present invention.

In addition to the specific embodiment of a phase modulator illustrated in FIG. 31, a multiplicity of other phase modulators can also be constructed. For example, a mirror can also be mounted outside of one of the transparent electrodes or replace transparent electrode 49. In addition, it is also possible to replace the full-surface electrodes with a pixelated electrode structure, to render possible an electrically controllable, spatially resolved phase modulation.

Figure 32:
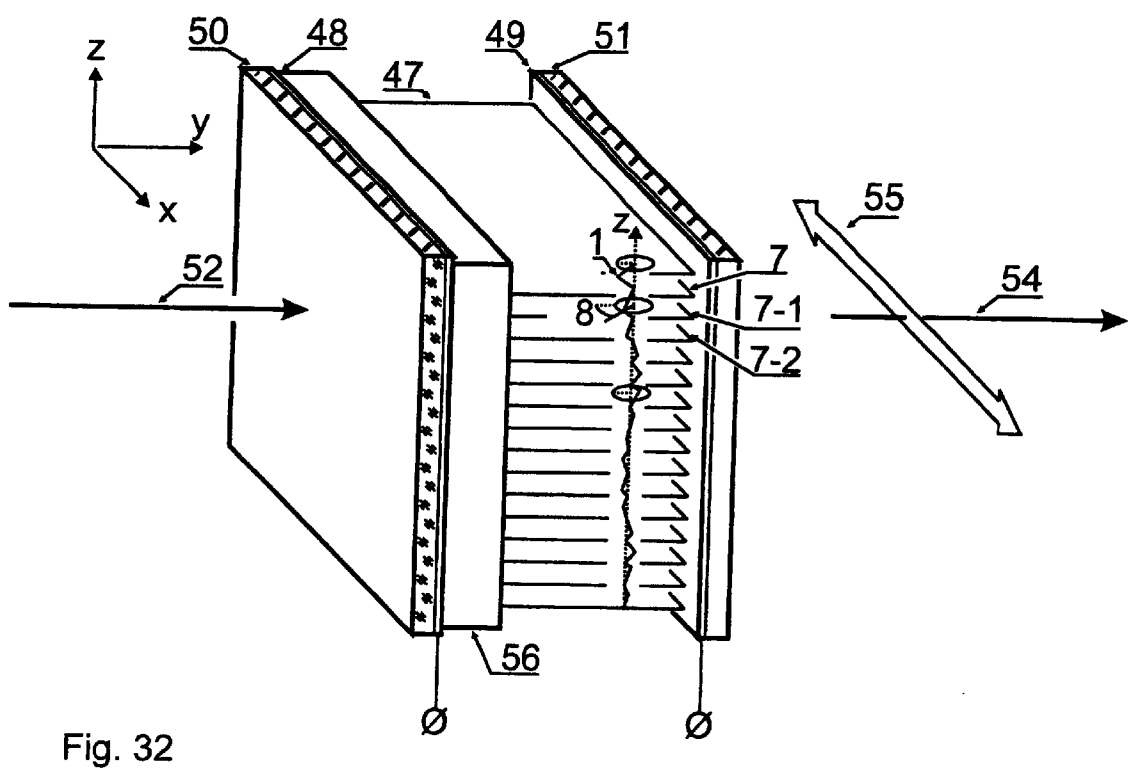
FIG. 32 shows another exemplary phase modulator that may use the liquid crystalline material of the present invention.
Figure 33:
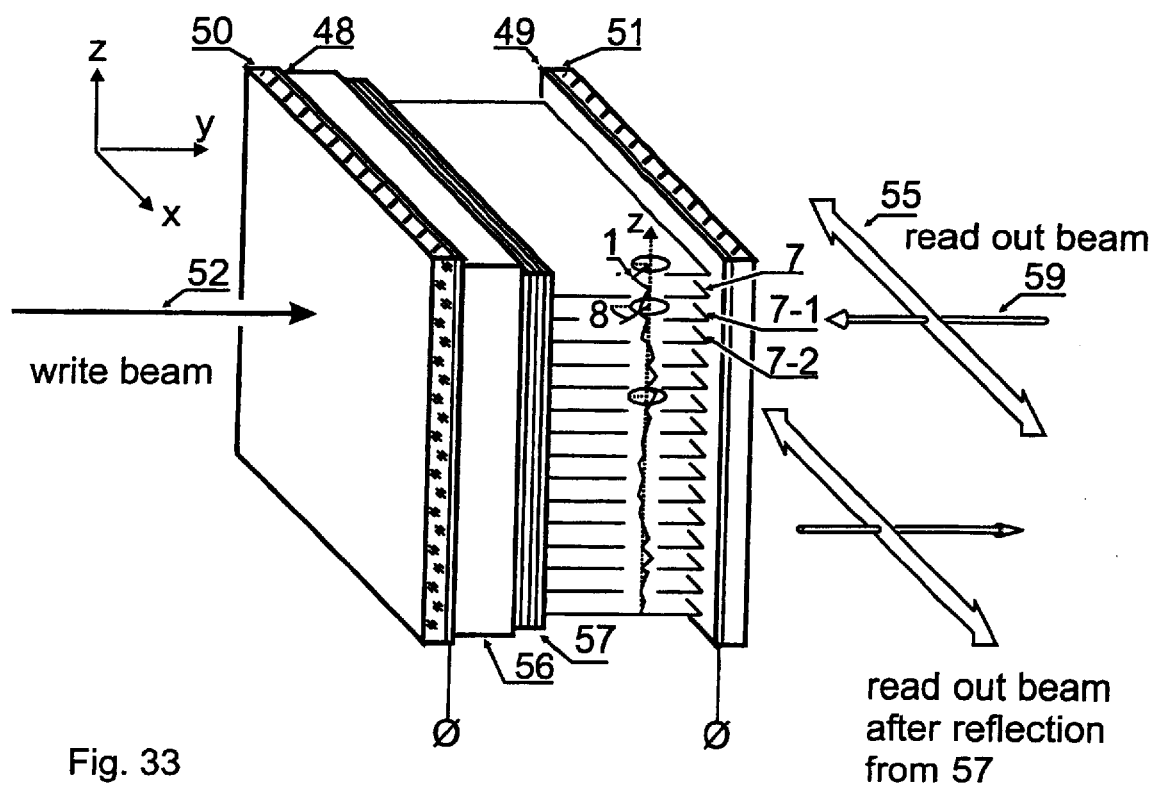
FIG. 33 shows another exemplary phase modulator that may use the liquid crystalline material of the present invention.
Figure 34:
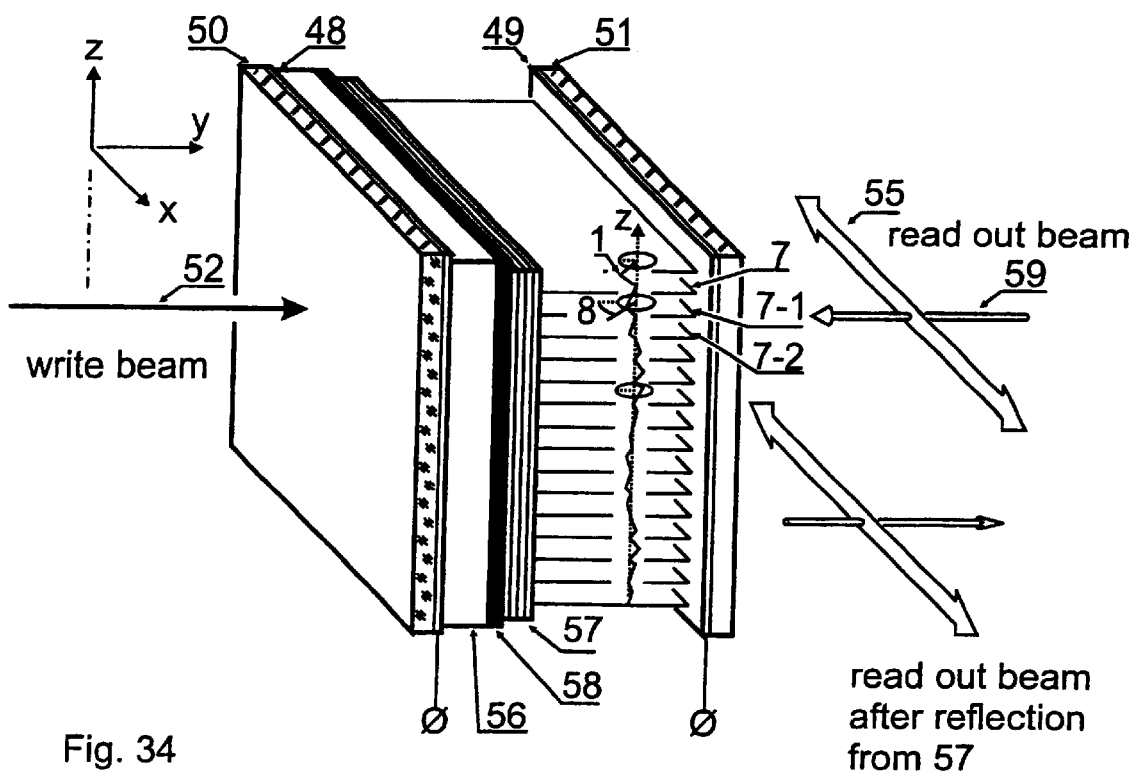
FIG. 34 shows another exemplary phase modulator that may use the liquid crystalline material of the present invention.

In further specific embodiments, referring to FIGS. 32 through 34, to provide an optically addressable, spatially resolved phase modulation, a photoconductive layer 56 may be placed on (or deposited over) a transparent electrode 48. A light-absorbing layer 58 between photoconductive layer 56 and mirror 57 leads to a more vigorous uncoupling of writing beam 52 and reading beam 59, permitting the use, for example, of light amplifiers having a higher amplification rate.

What is claimed is:

1. A liquid crystalline material having a lamellar layered structure, comprising:
   dimer molecules, the dimer molecules being one of arcuated dimer molecules and angular dimer molecules,
   wherein each of the dimer molecules includes two central units, the two central units having longitudinal axes, the longitudinal axes being at least approximately opposite inclination angles with respect to a normal direction of a layer of the lamellar layered structure, and an average refractive index being variable under influence of an electric field.

2. The liquid crystalline material of claim 1, wherein the at least approximately opposite inclination angles being within a range of approximately 10° to approximately 90°.

3. The liquid crystalline material of claim 1, wherein the two central units are one of bonded and joined to at least one of the dimer molecules to form a vertex with another dimer molecule.

4. The liquid crystalline material of claim 3, wherein the two central units are joined by a neutral molecular chain.

5. The liquid crystalline material of claim 3, wherein other vertices of the dimer molecules of adjacent layers are approximately equidirectional.

6. The liquid crystalline material of claim 5, wherein the other vertices of the dimer molecules of the adjacent layers are approximately oppositely directed and form a double-layer structure.

7. The liquid crystalline material of claim 6, wherein a helical structure including double layers and a predefined helical pitch is formed in response to absence of an external electric field, an azimuth angle of a pair of the other vertices of successive double layers changes uniformly by a predefined value so that the pairs of the other vertices rotate along a z-direction axis.

8. The liquid crystalline material of claim 5, wherein a helical structure including a predefined helical pitch is formed in response to absence of an external electric field, an azimuth angle of the other vertices of successive layers changes uniformly by a predefined value so that the other vertices of the successive layers rotate along a z-direction axis.

9. The liquid crystalline material of claim 8, wherein the helical pitch lies within a 50 to 1400 nanometer range in the absence of the external electric field.

10. The liquid crystalline material of claim 3, wherein the dimer molecules include at least one polyphilic fragment, the at least one polyphilic fragment being situated asymmetrically with respect to the vertex.

11. The liquid crystalline material of claim 10, wherein the at least one polyphilic fragment includes at least one perfluorinated chain of a form —$(CH_2)_n$—, n being a value from 4 to 16.

12. The liquid crystalline material of claim 1, wherein the dimer molecules include at least one transverse dipole moment.

13. The liquid crystalline material of claim 1, wherein the dimer molecules include at least one chiral center.

14. The liquid crystalline material of claim 13, wherein the at least one chiral center is bonded outside of the two central units to a residual molecular component.

15. The liquid crystalline material of claim 1, wherein the dimer molecules between the two central units being wing groups have at least one aliphatic fragment.

16. The liquid crystalline material of claim 15, wherein the at least one aliphatic fragment is composed of hydrocarbon chains of a form —$(CH_2)_n$—, n being a value from 0 to 16.

17. A device for modulating light, comprising:

a liquid crystalline material having a lamellar layered structure and including:
  dimer molecules, the dimer molecules being one of arcuated dimer molecules and angular dimer molecules,
  wherein each dimer molecule includes two central units, the two central units having longitudinal axes, the longitudinal axes being at least approximately opposite inclination angles with respect to a normal direction of a layer of the lamellar layered structure.

18. The device of claim 17, further comprising a generating arrangement for generating an electric field essentially perpendicular to a layer normal of the liquid crystalline material.

19. The device of claim 17, wherein the device is used for phase modulation of light.

* * * * *